United States Patent [19]

Romanauskas

[11] Patent Number: 5,545,118
[45] Date of Patent: Aug. 13, 1996

[54] TENSION BAND CENTRIFUGE ROTOR

[76] Inventor: William A. Romanauskas, 185 Main St. North, Southbury, Conn. 06488

[21] Appl. No.: 475,921

[22] Filed: Jun. 7, 1995

Related U.S. Application Data

[63] Continuation of Ser. No. 324,854, Oct. 18, 1994, abandoned, which is a continuation of Ser. No. 79,225, Jun. 18, 1993, abandoned, which is a continuation of Ser. No. 664,174, Mar. 19, 1991, abandoned, which is a continuation-in-part of Ser. No. 389,085, Aug. 2, 1989, abandoned.

[51] Int. Cl.⁶ .................................................. B04B 5/02
[52] U.S. Cl. ............................... 494/20; 494/16; 494/81; 74/572
[58] Field of Search ................... 494/16–21, 37, 494/43, 85, 81; 366/342, 343; 74/572, 573 R, 573 F, 574; 210/145, 360.1, 380.1, 380.3, 781; 422/72, 99

[56] References Cited

U.S. PATENT DOCUMENTS

| | | |
|---|---|---|
| 618,196 | 1/1899 | Ashworth et al. . |
| 3,028,075 | 4/1962 | Blum .......................... 494/20 |
| 3,602,066 | 8/1971 | Wetherbee et al. ............. 74/572 |
| 3,602,067 | 8/1971 | Wetherbee et al. ............. 74/572 |
| 3,797,737 | 5/1974 | Kadotani et al. . |
| 3,913,828 | 10/1975 | Roy . |
| 3,964,341 | 6/1976 | Rabenhorst .................... 74/572 |
| 3,982,447 | 9/1976 | Rabenhorst .................... 74/572 |
| 3,993,243 | 11/1976 | Dietzel et al. . |
| 3,997,106 | 12/1976 | Baram . |
| 4,020,714 | 5/1977 | Rabenhorst .................... 74/572 |
| 4,023,437 | 5/1977 | Rabenhorst .................... 74/572 |
| 4,036,080 | 7/1977 | Friedericy et al. .............. 74/572 |
| 4,039,006 | 8/1977 | Inoue et al. ................... 138/129 |
| 4,093,118 | 6/1978 | Sinn et al. ..................... 494/20 |
| 4,120,450 | 10/1978 | Whitehead ..................... 494/20 |
| 4,123,949 | 11/1978 | Knight, Jr. et al. ............. 74/572 |
| 4,160,521 | 7/1979 | Lindgren . |
| 4,176,563 | 12/1979 | Younger ........................ 74/572 |
| 4,198,878 | 4/1980 | Lewis et al. ................... 74/572 |
| 4,207,778 | 6/1980 | Hatch ............................ 74/572 |
| 4,244,240 | 1/1981 | Rabenhorst .................... 74/572 |
| 4,266,442 | 5/1981 | Zorzi ............................. 74/572 |
| 4,285,251 | 8/1981 | Swartout ........................ 74/572 |
| 4,341,001 | 7/1982 | Swartout ........................ 29/159 |
| 4,359,912 | 11/1982 | Small ............................. 74/572 |
| 4,370,899 | 1/1983 | Swartout ........................ 74/572 |
| 4,408,500 | 10/1983 | Kulkarni et al. ................ 74/572 |
| 4,443,727 | 4/1984 | Annen et al. ................... 310/261 |
| 4,468,269 | 8/1984 | Carey ............................. 156/175 |
| 4,481,840 | 11/1984 | Friedericy et al. .............. 74/572 |
| 4,502,349 | 3/1985 | Abiven et al. .................. 74/572 |
| 4,548,596 | 10/1985 | Sutton, III et al. ............. 494/20 |
| 4,585,433 | 4/1986 | Cole .............................. 494/20 |
| 4,585,434 | 4/1986 | Cole .............................. 494/20 |
| 4,586,918 | 5/1986 | Cole .............................. 494/20 |
| 4,589,864 | 5/1986 | Cole .............................. 494/20 |
| 4,624,655 | 11/1986 | Cole .............................. 494/20 |
| 4,659,325 | 4/1987 | Cole et al. ..................... 494/20 |
| 4,670,004 | 6/1987 | Sharples et al. ................ 494/16 X |
| 4,675,001 | 6/1987 | Johanson ....................... 494/85 |
| 4,701,157 | 10/1987 | Potter ............................ 494/16 |
| 4,817,453 | 4/1989 | Breslich, Jr. et al. ........... 494/16 X |
| 4,860,610 | 8/1989 | Popper et al. .................. 74/572 |
| 4,886,486 | 12/1989 | Grimm et al. .................. 494/20 |
| 4,991,462 | 2/1991 | Breslich, Jr. et al ............ 74/573 RX |
| 5,057,071 | 10/1991 | Piramoon ....................... 494/81 X |

FOREIGN PATENT DOCUMENTS

| | | |
|---|---|---|
| 473870 | 1/1948 | Canada . |
| 00881968 | 12/1982 | European Pat. Off. . |
| 290687 | 11/1988 | European Pat. Off. ......... 494/38 |
| 2082274 | 11/1971 | France . |
| 2538719 | 10/1975 | France . |
| 1782602 | 3/1972 | Germany ....................... 494/20 |
| 3346289 | 7/1984 | Germany . |
| 58-30548 | 2/1983 | Japan . |

(List continued on next page.)

Primary Examiner—Charles E. Cooley

[57] ABSTRACT

An applied load accepting band for a centrifuge rotor is configured such that while rotating, the applied loads on the band are balanced by the tension in the band, so that during rotation the band is subjected only to a tensile stress.

6 Claims, 15 Drawing Sheets

FOREIGN PATENT DOCUMENTS

| | | |
|---|---|---|
| 62-39292 | 8/1987 | Japan . |
| 63-29139 | 6/1988 | Japan . |
| 63-319073 | 12/1988 | Japan . |
| 296421 | 4/1954 | Switzerland ............................ 494/20 |
| 0492308 | 11/1975 | U.S.S.R. ................................. 494/20 |
| 794277 | 2/1979 | U.S.S.R. . |
| 1174615 | 11/1983 | U.S.S.R. . |
| 0505446 | 5/1939 | United Kingdom ...................... 494/20 |
| 1353390 | 8/1971 | United Kingdom . |
| 1605218 | 9/1977 | United Kingdom . |
| 2097297 | 4/1982 | United Kingdom . |
| 2107615 | 5/1983 | United Kingdom ...................... 494/85 |
| WO91/02302 | 2/1991 | WIPO . |
| WO92/15930 | 9/1992 | WIPO . |

$$\frac{R}{R_0} = 1 + (1-K)^N \left( \frac{1}{\cos\theta} - 1 \right)$$

$$\frac{d\left(\frac{R}{R_0}\right)}{d\theta} = (1-K)^N \left[ \frac{\sqrt{1-\cos^2\theta}}{\cos^2\theta} \right]$$

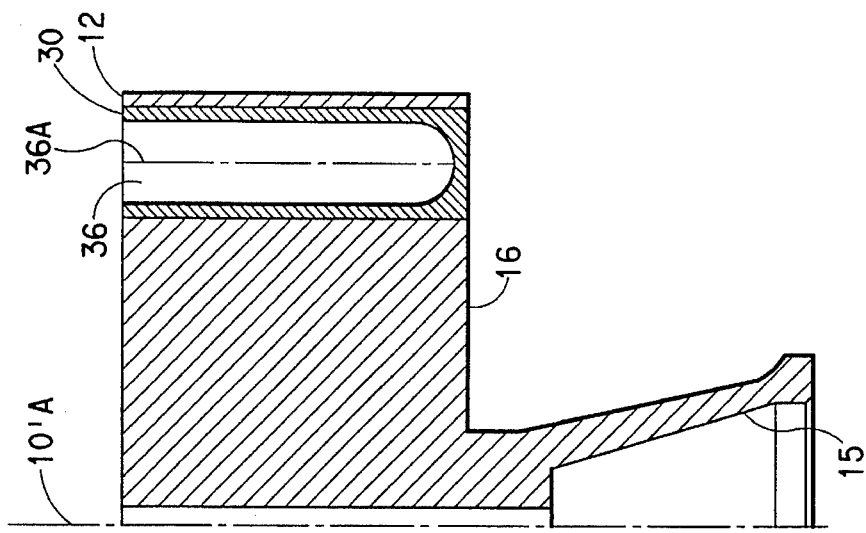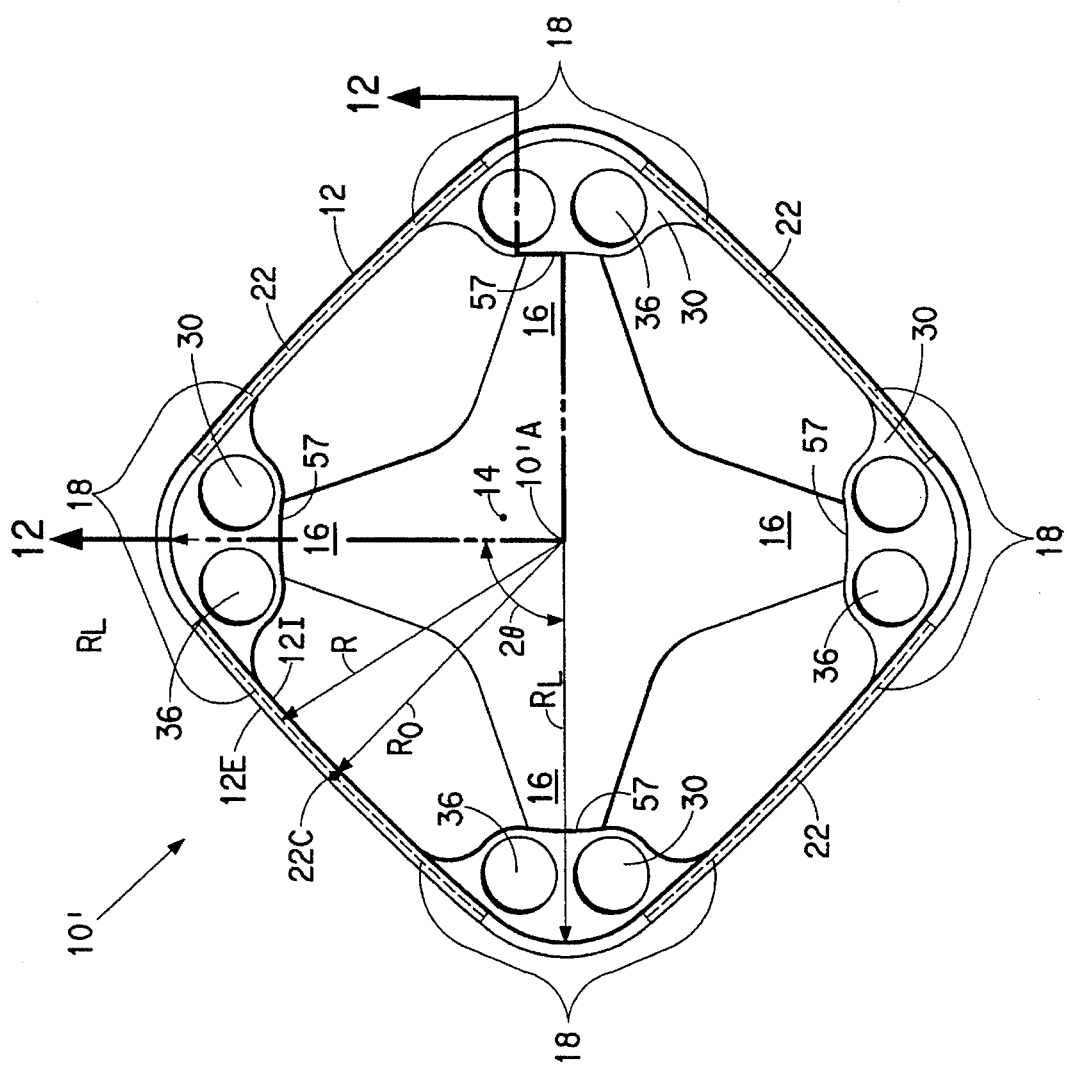

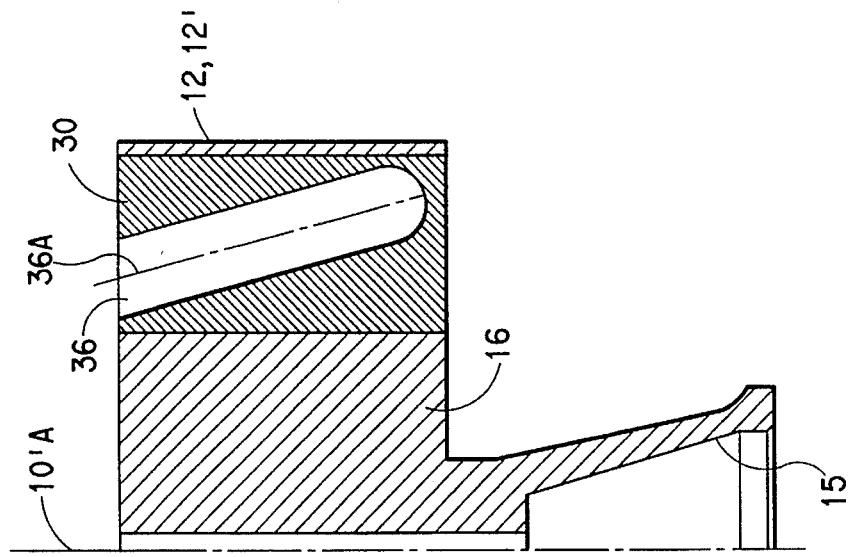
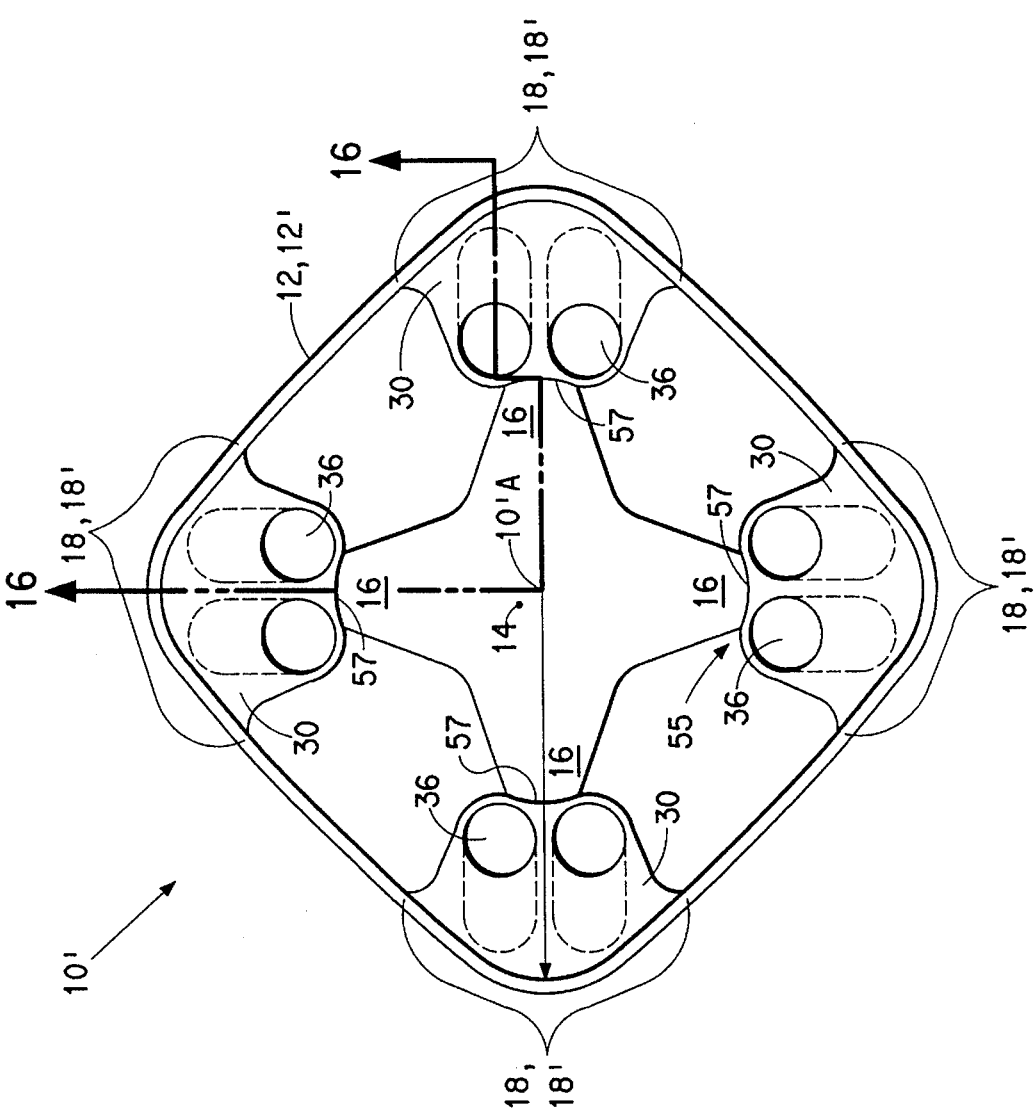

TENSION BAND CENTRIFUGE ROTOR

CROSS REFERENCE TO RELATED APPLICATIONS

This is a continuation of application Ser. No. 08/324,854 filed Oct. 18, 1994, now abandoned, which is a continuation of application Ser. No. 08/079,225 filed Jun. 18, 1993 (now abandoned), which is itself a continuation of Ser. No. 07/664,174, filed Mar. 1, 1991 (now abandoned), which is a continuation-in-part of Ser. No. 07/389,085, filed Aug. 2, 1989 (now abandoned).

BACKGROUND OF THE INVENTION

1. Field of the Invention

The present invention relates to a band for a centrifuge rotor, and in particular, to a band configured such that, in operation, it is subjected only to tensile forces.

2. Description of the Prior Art

The manufacture of rotating structures, such as centrifuge rotors and energy storage flywheels, has evolved from the use of homogeneous materials, such as aluminum and titanium, toward the use of composite materials. The use of such materials is believed advantageous because it permits the attainment of increased centrifugal load carrying capability. The increased load carrying capability is achieved because the lighter weight of the composite rotor permits it to spin faster for a given motive input, thus resulting in a greater relative centrifugal force.

The rotating structures of the prior art believed relevant to the present invention each have some form of band that, while at rest, exhibits a predetermined arbitrary shape. However, such a band is subjected during operation to a load due to the tendency of the band to change from the arbitrary rest shape to some equilibrium rotating shape. This phenomenon may be understood from the following simplified example.

Consider an applied load accepting band for a centrifuge rotor that in the rest (i.e., non-spinning) condition is circular in shape. Assume that this band accepts three applied loads corresponding to three equiangularly spaced sample carriers. When such a rotor is spun the effects of centrifugal force on the sample carriers apply loads that act radially outward, tending to pull the band to form "corners". The perimeter of the band generally intermediate the applied loads will thus deflect radially inwardly from their original circular shape. Since the band has some predetermined stiffness associated with it, the deflection of the band from its rest shape to its equilibrium shape while rotating imposes a bending stress on the band. This bending stress in the band does not contribute to its load carrying capability, and in fact, is deleterious to the band since it results in reduced rotor life.

In view of the foregoing it is believed advantageous to provide a centrifuge rotor which is not exposed to the stresses associated with the change in shape as the band is spun, thus avoiding the deleterious effects attendant therewith.

SUMMARY OF THE INVENTION

The present invention relates to an applied load accepting band for a centrifuge rotor that is configured such that, while rotating, the applied loads on the band are balanced by the tension in the band, so that during rotation the band is subjected only to a tensile force.

BRIEF DESCRIPTION OF THE DRAWINGS

The invention will be more fully understood from the following detailed description thereof, taken in connection with the accompanying drawings, which form a part of this application, and in which:

FIG. 1 is a plan view of a generalized centrifuge rotor (with the sample carriers omitted for clarity) having an applied load accepting band in accordance with the present invention, while

FIG. 3A is a free body diagram of a portion of a band for a centrifuge rotor in accordance with the present invention in which the applied load accepting band is realized using a wound band formed of a composite material that has a constant thickness dimension from which the equation describing the shape of such a band may be derived, while

FIG. 11 is a plan view of a centrifuge rotor having an applied load accepting band in accordance with the present invention in which sample carriers of the vertical type are disposed at load accepting regions of the band and in which the mounting struts are attached to the sample carriers;

FIG. 12 is cross sectional view of the rotor of FIG. 11 taken along section lines 12—12 therein;

FIGS. 15 and 16 are, respectively, a plan view and a side elevational view taken along section lines 16—16 in FIG. 15 illustrating a fixed angle centrifuge rotor having an applied load accepting band as shown in either FIG. 11 or in FIG. 13, the sample carriers disposed at the load accepting regions of the band being of the fixed angle type;

Figure 1:
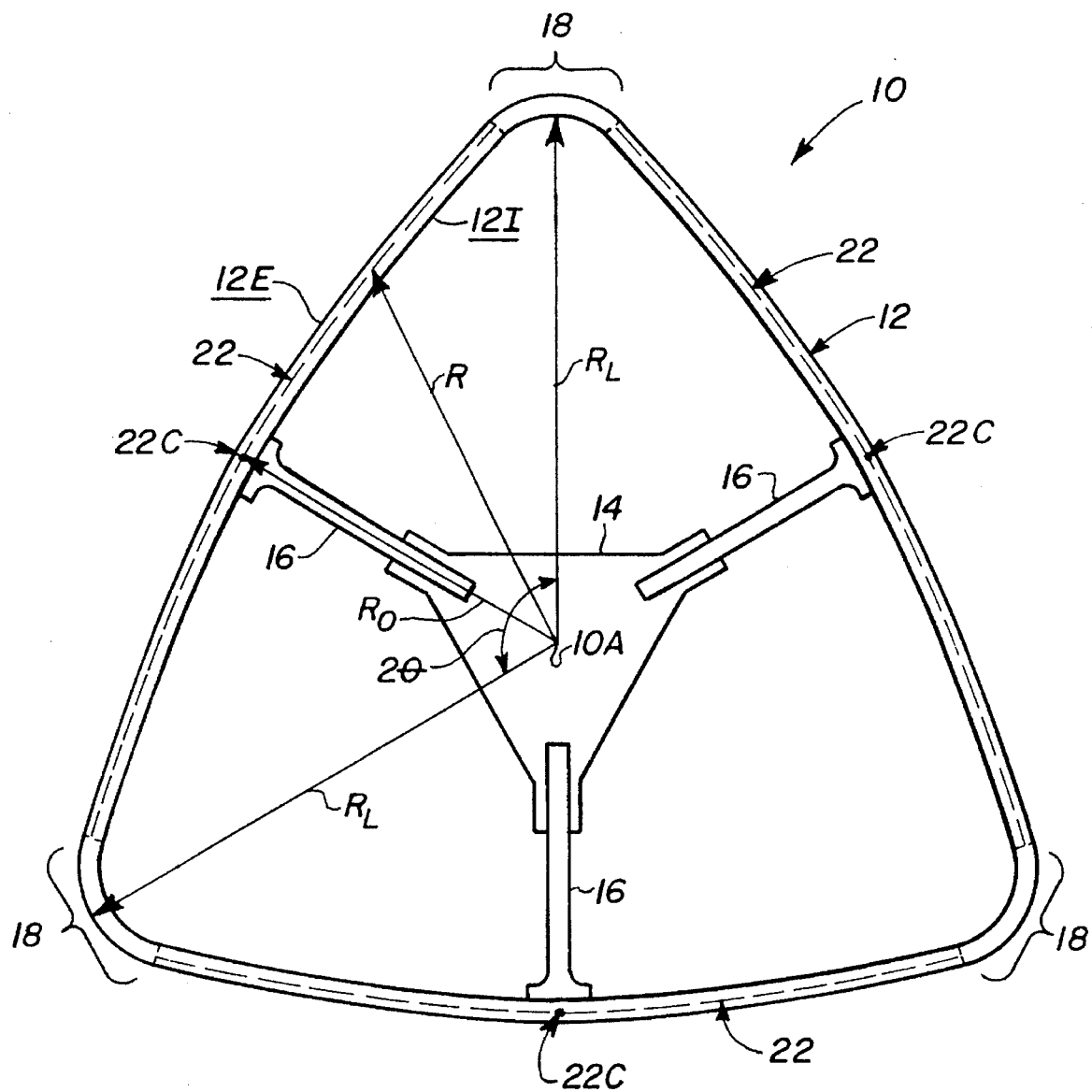

An Appendix setting forth the derivation of the equations discussed herein is appended to and forms part of this application.

DETAILED DESCRIPTION OF THE INVENTION

Throughout the following detailed description similar reference numerals refer to similar elements in all figures of the drawings.

Figure 2:
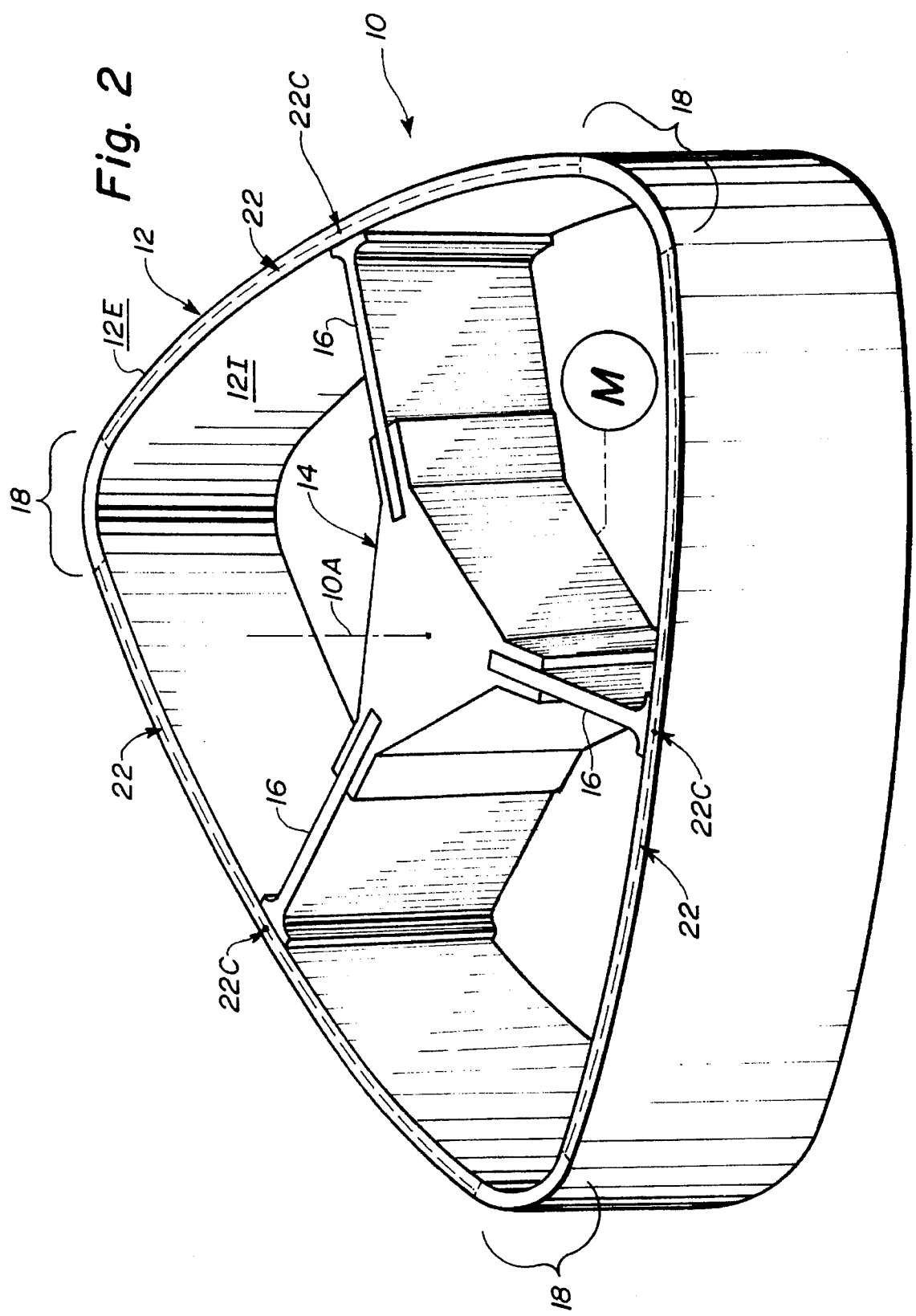
FIG. 2 is an isometric view of the rotor of FIG. 1.

Shown in FIGS. 1 and 2 are, respectively, a plan and an isometric view of a centrifuge rotor 10 having a peripheral applied load accepting band 12 in accordance with the present invention. The band 12 has a predetermined thickness associated therewith and has interior surface 12I and an exterior surface 12E thereon.

The rotor 10 includes a central hub 14 which may be connected, as diagrammatically illustrated in FIG. 2, to a suitable motive source M whereby the rotor 10 may rotate about its axis of rotation 10A. The central hub 14 has a plurality of radially outwardly extending struts 16. The hub and the struts may be formed from a composite, such as a reinforced plastic. The hub and the struts may alternately be formed of metal.

The peripheral band 12 is mounted to the struts 16 and surrounds the hub 14. The band 12 may be connected to the struts 16 by any suitable means, as will be described. The band 12 has a plurality of angularly spaced, applied load accepting regions 18 defined thereon. These regions 18 are those locations on the band 12 where sample carriers 30 to be described (FIGS. 4 to 7) are attached to the band 12 or those locations where swinging bucket sample carriers 30 to be described (FIGS. 8 to 9) abut against the interior surface 12I of the band 12. Although for purposes of analysis the loads imposed on the band can be analyzed in terms of a single point on the band through which the load can be said to act, it should be appreciated that the load accepting regions 18 in actuality extend some predetermined finite distance about the periphery of the band 12. Adjacent applied load accepting regions 18 are, in a plane perpendicular to the axis 10A (that is, the plane of FIG. 1), spaced apart a predetermined angular distance (2Θ), depending upon the number of the sample carriers 30 on the rotor 10. The angle (2Θ) is related to the number N of sample carriers disposed on the rotor 10, with (2Θ) (in degrees) being equal to 360 divided by N.

As will be developed the applied load accepting band 12 in accordance with the present invention is, during centrifugation, subjected to only tensile force, thereby eliminating therefrom regions of high stress concentration which may reduce band life.

The applied load accepting band 12 may be fabricated either from a composite material or from a metal, such as aluminum or titanium. A band formed of a composite material is discussed first. Considerations of economy of manufacture using a composite material dictate that the band formed therefrom exhibits a constant cross sectional area. Accordingly, in the discussion that follows, the composite band exhibits a cross section area that is constant along its entire periphery.

In accordance with the present invention, in a plane perpendicular to the axis 10A of rotation of the rotor 10, the applied load accepting band 12 has a predetermined equilibrium curve 22, indicated by the dashed line, defined therein between adjacent applied load accepting regions 18. The equilibrium curve 22 is used herein as a definition of the shape of the band. Preferably the equilibrium curve is construed to extend centrally through the thickness of the band 12, that is, midway between the interior surface 12I and the exterior surface 12E thereof. However, it should be understood that the equilibrium curve 22 may be defined as extending through any radial location within the thickness of the band 12. The equilibrium curve 22 has a predetermined center point 22C therealong. Preferably, the strut 16 is attached to the band 12 at the center point 22C of the equilibrium curve 22 therein.

Figure 1A:
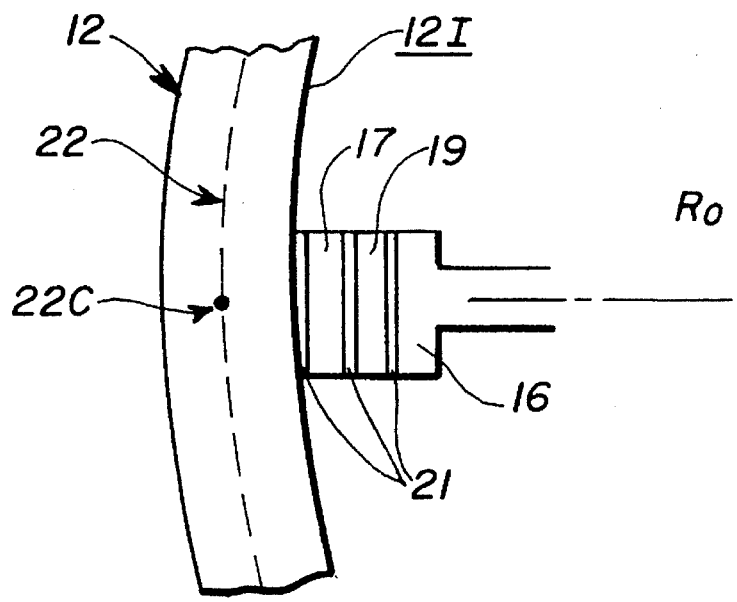
FIG. 1A is an enlarged view of a portion of FIG. 1 illustrating the attachment of the strut to the band.

As seen in the enlarged view of FIG. 1A, proceeding radially inwardly from the interior surface 12I of the band at the desired mounting location to the radially outer surface of the strut 16 is an elastomeric sheet 17 and a layer 19 of a composite material. A suitable adhesive layer 21 is disposed between the interior surface 12I of the band 12 and the elastomeric sheet 17, between the elastomeric sheet 17 and the layer 19 of composite material, and between the layer 19 of composite material and the strut 16. The elastomeric sheet 17 is provided to accommodate shear to limit strain in the adhesive layers 21, while the composite layer 19 is provided to accommodate stress in the transverse direction. Any suitable adhesive compatible with the materials being adhered may be used.

Figure 3B:
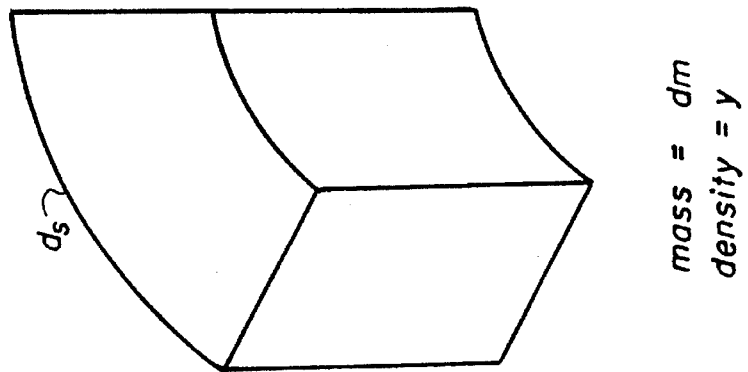
FIGS. 3B through 3D illustrate the mathematical relationships used in the derivation of the Appendix.
Figure 3A:
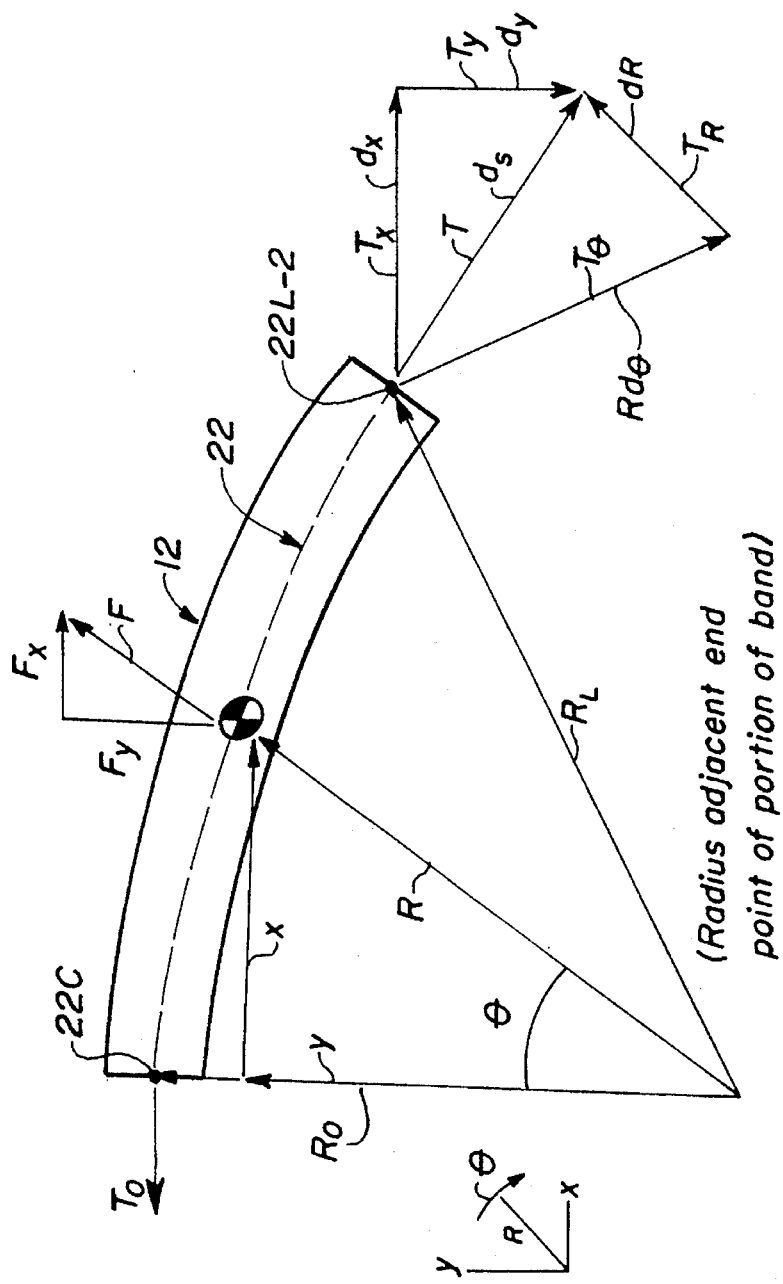

Each point on the equilibrium curve 22 lies, in the plane of FIG. 1 and the free body diagram of FIG. 3A, a predetermined radial distance R from the axis 10A. The distance from the axis 10A to the midpoint 22C is denoted by the reference character $R_0$ while the distance from the axis 10A to the applied load accepting regions is denoted by the reference character $R_L$. Since the adjacent applied load accepting regions 18 are spaced angularly a distance (2Θ), the angular distance between the radius $R_0$ and a radius R is denoted by the angle Θ. When the band 12 is removed from the struts 16 by which it is attached to the hub 14 and while the band 12 is at rest, the equilibrium curve 22 from the midpoint 22C to a point adjacent to either one of the applied load accepting regions 18 is defined by the relationship:

$$d(R/R_0)/d\Theta = (R/R_0)^2 \text{ RAD}(1-\{K/2\ [(R/R_0)^2-1]\})^2-(R/R_0) \quad (1)$$

$$K=[(\gamma\ \omega^2\ R_0^2)\ (1/g)\ (1/\sigma_0)] \quad (2)$$

where $R_0$ is the distance from the axis 10A to the midpoint point 22C on the equilibrium curve 22 between two adjacent applied load receiving regions 18, where γ is the is the band density, ω is the angular speed, g is the acceleration due to gravity, and $\sigma_0$ is the stress per unit area;

where K is a constant of curvature (shape factor) of the band that has values greater than zero and less than 1, such that 0<K<1.

It is noted that the symbol "RAD" is used throughout this application (including the Appendix) to denote the radical sign indicating the computation of square roots.

The derivation of Equations (1) and (2) is set forth in the Appendix, which is appended to and forms part of this application.

The constant K defines a shape factor K for each of the family of equations that satisfy the differential equation (1). Since the band is to be exposed only to a tensile force while spinning the shape factor K must be limited within the range $0<K<1$. If K lies outside these limits an equilibrium condition is not possible. The physical explanation of the limits on K can be understood with reference to a consideration of the ranges of loads able to be accommodated by a band in accordance with the invention.

Figures 3C, 3D:
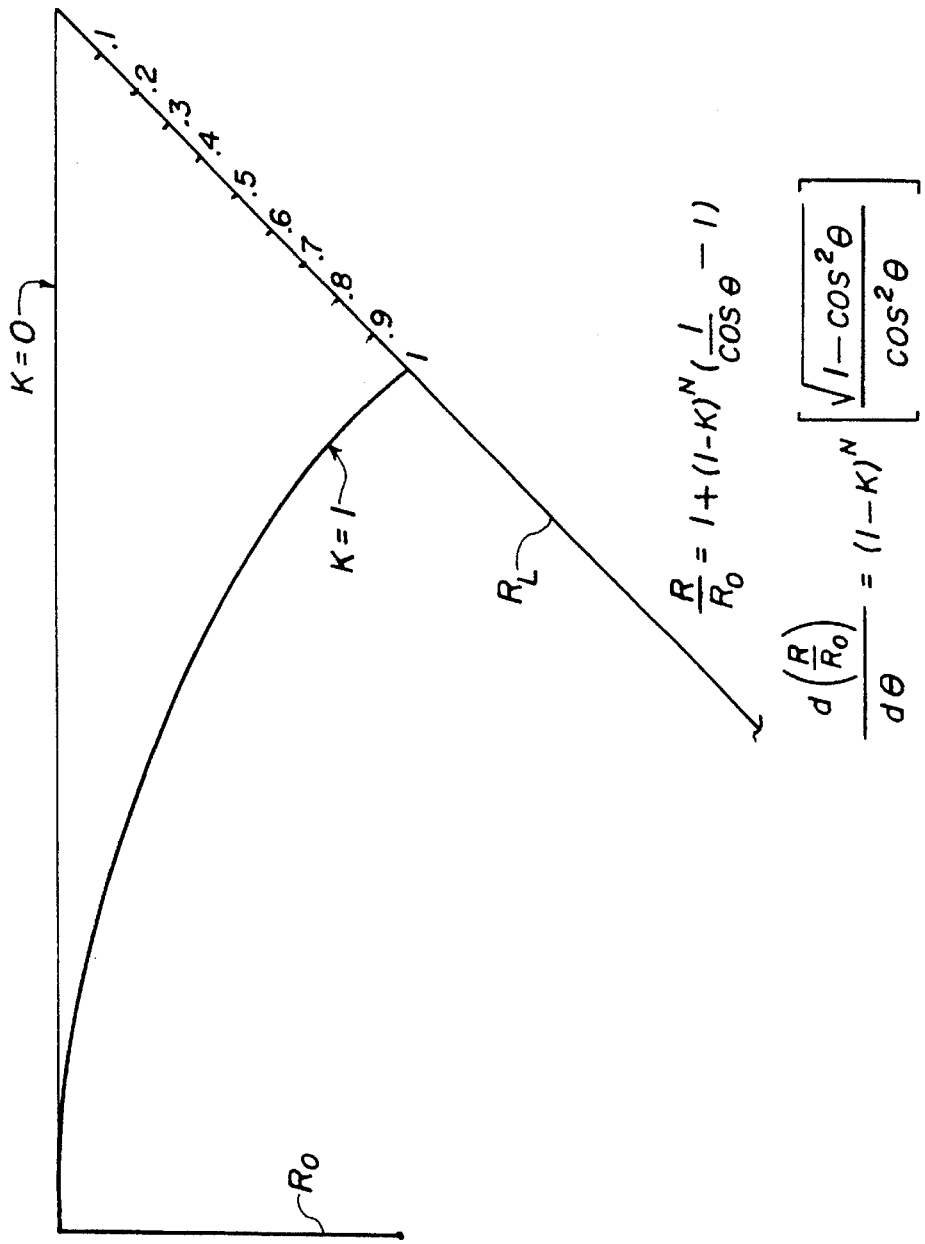

As seen in the drawing FIG. 3D the differential Equations (1) define a family of equilibrium curves. If the shape factor $K=1$, the equilibrium curve takes the form of a circle. However, a circular form for the equilibrium curve would mean that a band having such an equilibrium curve has no component of band tension available to contribute to supporting a load applied to the band. A band subjected only to a tensile force while spinning would thus be able to accommodate zero load—an impractical result. Thus to support a load a circular band must necessarily be subjected to bending.

If the shape factor $K=0$, the equilibrium curve takes the form of a straight line. In this instance a band having such an equilibrium curve has no component of band tension able to contribute to supporting the centrifugal force exerted on the mass of the band. Thus, a band having an equilibrium curve in the form of a straight line and being subjected only to a tensile force while spinning must have zero mass, a clearly absurd result.

Thus, a band in accordance with the present invention which is subjected only to tensile force while spinning must, of necessity, have an equilibrium curve in which the shape factor K lies within the range $0<K<1$.

The equilibrium curve of any band in accordance with the present invention (that is, a band subjected only to tension while spinning) will exhibit an equilibrium curve between a midpoint of a band segment and a point on the band next adjacent to the applied load accepting region that closely matches one of the family of equilibrium curves defined by Equations (1). It is again noted that since the load accepting regions 18 has some finite extent, the shape of an actual band may deviate from its equilibrium curve in the load accepting regions 18 and still remain within the contemplation of the invention.

Moreover, it should be understood that, within the portion of the band between the midpoint and the point adjacent to the applied load accepting region a band 22 may also deviate from the mathematical definition of the equilibrium curve given by Equations (1) and (2) and still remain within the contemplation of the present invention. To this end the equilibrium curve 22 may be viewed as a reference curve that defines a neutral or reference radial distance for each value of $\Theta$. So long as the actual radial distance $R_{actual}$ of a band approximates the reference radial distance R as defined by the equations for the equilibrium curve, such a band is to be construed as lying within the contemplation of the present invention. Thus, the radial distances $R_{actual}$ in an actual band need not match the equilibrium curve of the equations point by point, so long as the band is generally loaded only by tension while spinning it is to be construed to lie within the contemplation of the invention.

Whereas the optimum performance is provided when the shape of the band matches the equilibrium curve and thus the stresses created by bending moments are equal to zero, it is recognized that some stress created from bending moments can be tolerated in the design of a centrifuge rotor which produces less than optimum performance. Consequently, bands which approximate the equilibrium curve must also be construed as lying within the contemplation of this invention.

To determine that the equilibrium curve of a band in an actual rotor the band is first removed from the struts that affix it to the hub. The contour of the actual band may then be plotted. If the band is exposed only to tension when spinning, the equilibrium curve of the band will closely match one of the family of equilibrium curves shown in FIG. 3D. That is, the equilibrium curve of the band from the actual rotor will fall on one of the family of curves in the range between $R_0$ and $R_L$ or will lie within a predetermined range of one of the family of equilibrium curves.

To verify that such a band is subjected to only a tensile force, a brittle lacquer test may be performed (preferably prior to the disassembly of the rotor from the struts, as discussed above). The brittle lacquer test is discussed in Richard C. Dove and Paul H. Adams, "Experimental Stress Analysis and Motion Measurement", Charles E. Merrill Books, Inc., Columbus, Ohio (1964). Other tests to verify that the band is subjected only to tensile forces could be performed. Such testing could include the mounting of strain gauges on inside and outside radial surfaces of the band.

A band 12 having a configuration that satisfies the equilibrium curve 22 of Equations (1) and (2) will be subjected only to tensile force while spinning. The shape of the band 12 will not change while the band is accelerating to or rotating at speed. However, the band 12 may grow outwardly, and the sample carriers 20 affixed to the band may displace radially outwardly, both movements due to to centrifugal force effects. However, the loads imposed on the band 12 due both to its weight and to the weight of the load, will be balanced by the tensile force in the band. Thus, the band will undergo no bending stresses. The operating size of the band 12 can be accurately predicted from the tension in the band and the modulus thereof. The equilibrium curve that defines the band when operating at design speed and at design loading conditions may hereafter be referred to as the design equilibrium curve or the design equilibrium shape.

When the band 12 is fabricated from a composite material a suitable material is a tape formed of a plurality of uniaxial fibers surrounded by a thermoplastic matrix, such as polyether ketone ketone (PEKK) or polypropylene. The fiber can be an aramid fiber such as that manufactured and sold by E. I. DuPont de Nemours and Company under the trademark "KEVLAR" or carbon and graphite fiber, including pitch and polyacrylonitrile (PAN)-based materials, and sold in continuous, chopped, mat, and woven forms: and carbon fiber preimpreganted with an epoxy resin under the Registered Trademark "THORNEL" owned by Union Carbide. The band 12 is formed by filament winding using either tow or tape on a mandrel that has a predetermined shape that corresponds to the equilibrium curve 22. As the tape is wound on the mandrel, the resulting band has imparted thereto the shape of the equilibrium curve. The band 12 so formed has a generally constant radial or thickness dimension. In addition, the band 12 (or the band 12' to be discussed) can be fabricated as an injection molded or as a compression molded composite formed of a plastic material, such as nylon reinforced with chopped fiber (e.g., glass filled nylon).

It should also be noted that a band having a constant cross section may also be formed from a homogeneous material, such as titanium or aluminum.

The struts 16 are preferably attached to the interior surface 12I of the band 12 at the midpoints 22C along the equilibrium curve 22. In practice, the struts 16 may preload the band slightly, in order to accommodate variations in the radial stiffness of the band 12 and the strut 16. This preload may deform the shape of the band while it is attached to the struts from the shape corresponding to the equilibrium curve. Deformation due to the preload is, however, a elastic deformation. It should thus be clearly understood that it is the shape of the band when the same is removed from the struts and is at rest that meets, as discussed above, the relationships set forth in Equations (1) and (2) and thus falls within the scope of the present invention. Due to the preload, when assembled on the struts and at rest, the band imposes a first predetermined compressive (i.e., radially inwardly directed) force on the struts. However, while the band is spinning, the band grows due to centrifugal force effects and the band imposes a predetermined lesser compressive force on the struts.

It should be recognized that the design equilibrium curve can only be obtained when the bending stresses are equal to zero. In use, it is beneficial to provide some preload of the band against the strut in order to compensate for differences in radial stiffness and the associated differences in deformation when the rotor is rotated. By design, the equilibrium shape will only be obtained in this case when the rotor reaches the design speed and contains the design load. At zero speed the bending stresses due to the preload are at a maximum. As the rotor increases speed the bending stresses created by the preload decrease while the stress created by the load increase. When the rotor reaches the design speed the bending stress created by the preload is zero and the band is totally in tension due to the load. At this point the band obtains the design equilibrium curve.

Figure 10:
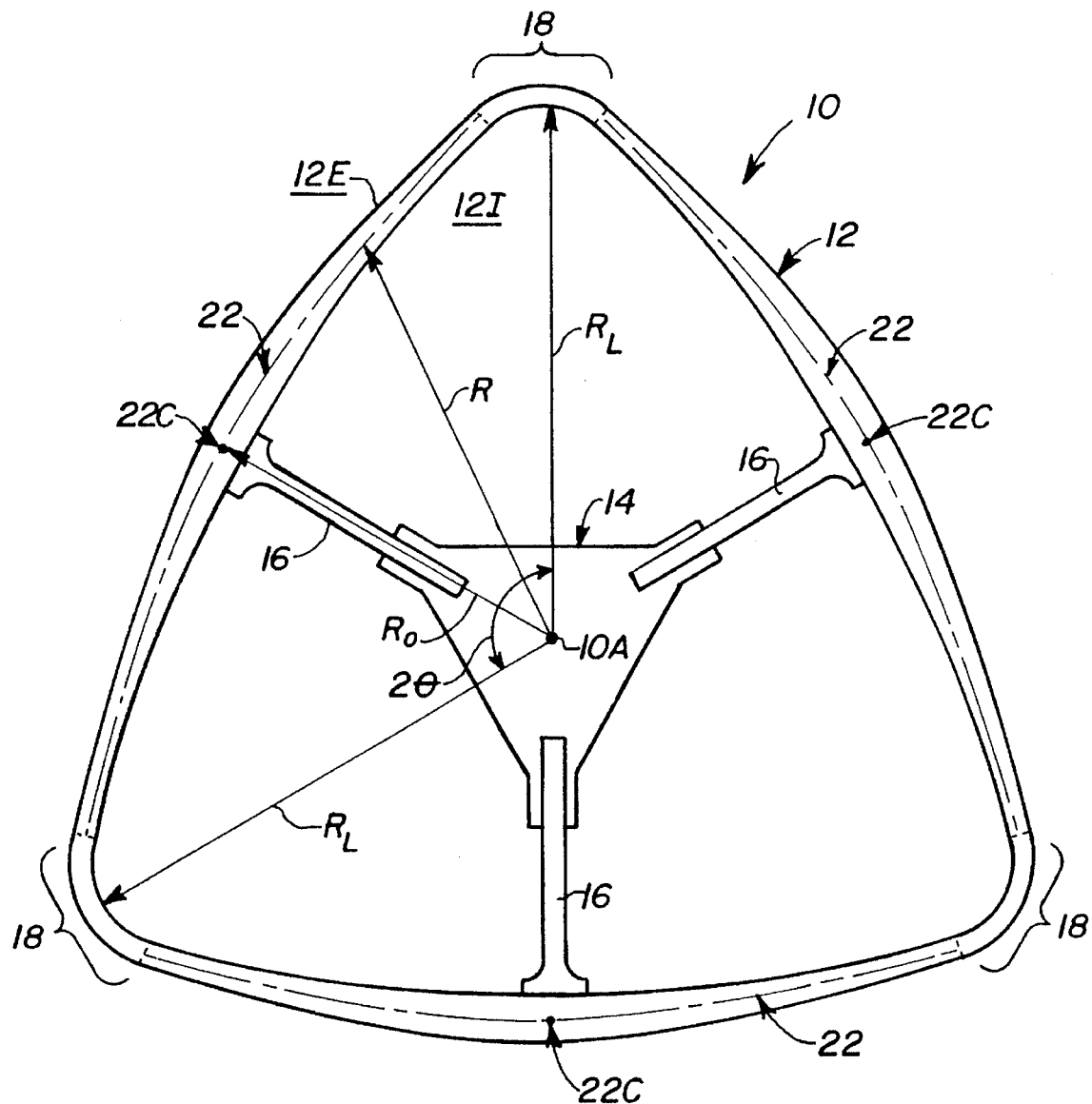
FIG. 10 is a plan view similar to FIG. 1 showing an applied load accepting band having a variable cross sectional area in accordance with the present invention.

The band 12 heretofore discussed exhibits a substantially uniform cross sectional area along the equilibrium curve. However, from the standpoint of efficiency of material usage, it may be desired to provide a band that exhibits a constant stress (as opposed to a constant cross section) along its periphery. In accordance with an alternate embodiment shown in FIG. 10, it lies within the contemplation of this invention that the band 12 may exhibit a constant stress, with a variable cross sectional area along the equilibrium curve. In this instance, as is seen from the Appendix, the equilibrium curve corresponds to the following:

$$d(R/R_0)/d\Theta = (R/R_0) \, \text{RAD}[(R/R_0)^2] \, (\exp\{-K \, [(R/R_0)^2-1]\}-1) \quad (1A)$$

$$K=[(\gamma \, \omega^2 \, R_0^2) \, (1/g) \, (1/\sigma_0)] \quad (2A)$$

$$(A/A_0)=\exp \{-(K/2) \, [(R/R_0)^2-1]\} \quad (3A)$$

where A is the cross sectional area of the band and $A_0$ is the cross sectional area of the band at the radius $R_0$.

A band corresponding to the relationships of Equations 1A and 2A may be fabricated from a homogeneous material such as titanium or aluminum, by any suitable process, such as numerical controlled milling. It should be understood that a band in accordance with this alternate embodiment of the invention may be fabricated from a composite material.

A band 12 in accordance with the present invention, whether implemented in a composite material or a homogeneous material, may be used in any of a variety of centrifuge rotors, as will be appreciated from FIGS. 4 through 9.

Figure 5:
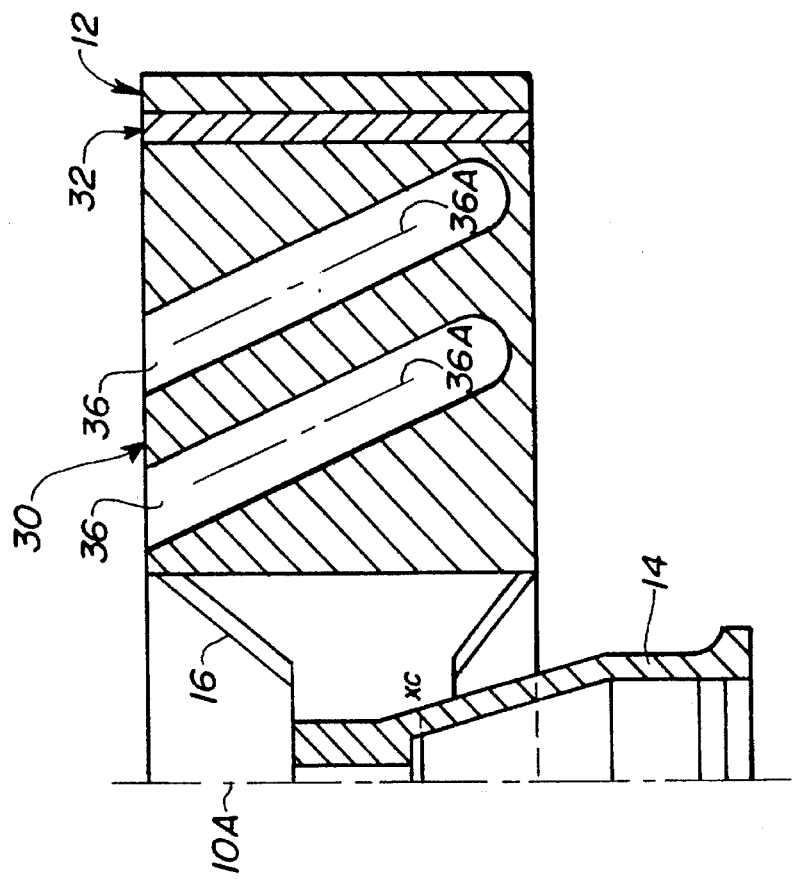
FIG. 4 and 5 are, respectively, a plan view and a side elevational view taken along section lines 5—5 in FIG. 4 illustrating a fixed angle centrifuge rotor having an applied load accepting band in accordance with the present invention.
Figure 4:
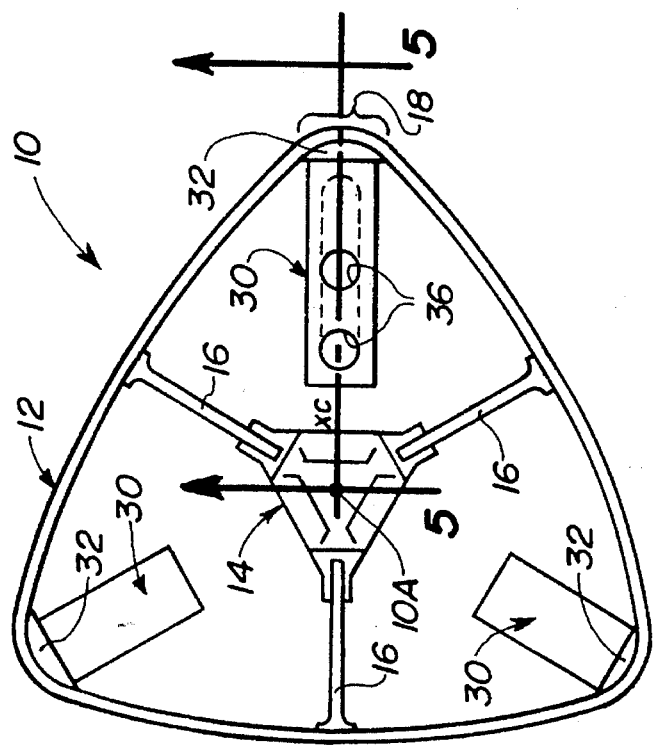
Figure 7:
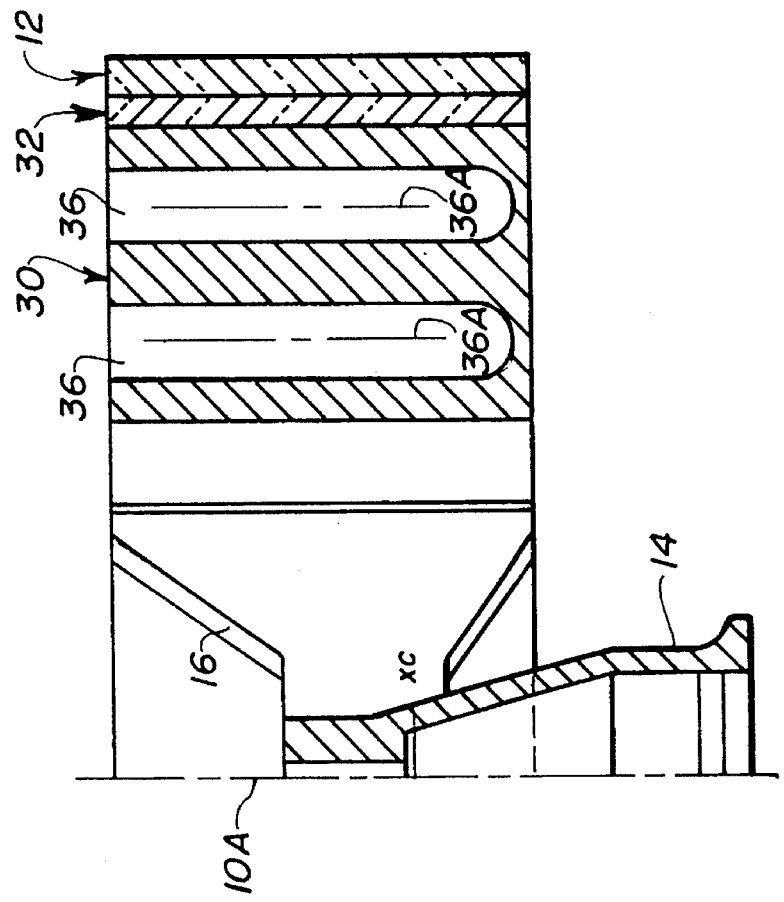
FIGS. 6 and 7 are, respectively, a plan view and a side elevational view taken along section lines 7—7 in FIG. 6 illustrating a vertical centrifuge rotor having an applied load accepting band in accordance with the present invention.
Figure 6:
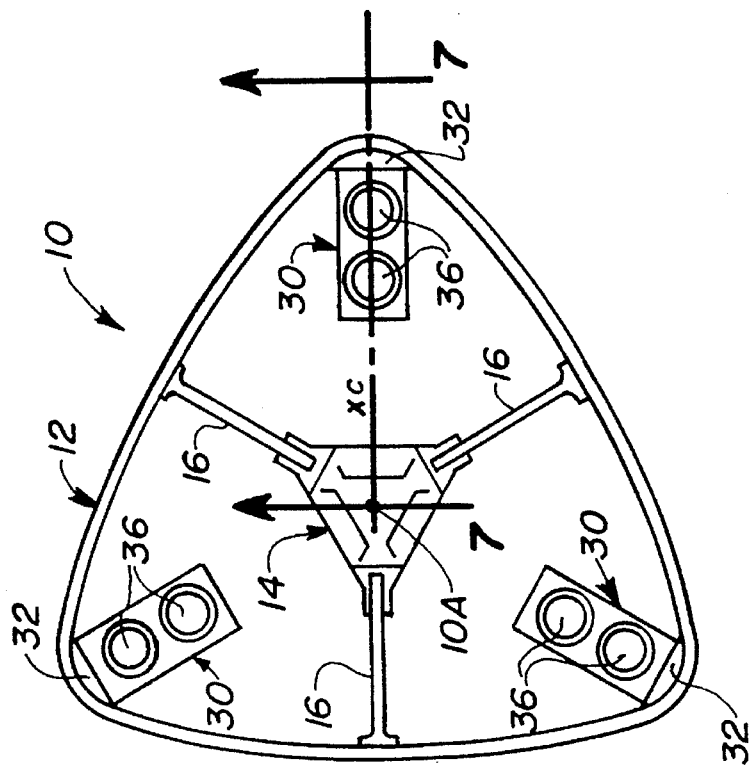

FIGS. 4 and 5 illustrate a plan and a vertical cross section view of a rotor 10 having a band 12 in accordance with the present invention in which the sample carriers 30 are configured to define a fixed angle centrifuge rotor. In this instance each of the sample carriers 30 is attached directly to and supported by the band 12 at an applied load accepting region 18. The carrier 30 is mounted to a load transition pad 32 that is attached to the band 12 at the applied load accepting region 18. As seen in FIGS. 4 and 5 the sample carriers 30 have sample container receiving cavities 36 therein. Although two such cavities 36 are illustrated, it should be understood that any convenient number of cavities 36 may be so formed in the carrier 30. In the embodiment of FIGS. 4 and 5, the axis 36A of each cavity 36 is inclined with respect to the axis of rotation 10A. Alternatively, in FIG. 6, the axis 36A of each cavity 36 is parallel to the axis of rotation 10A, and a rotor of the vertical type is thus defined.

Figure 6A:
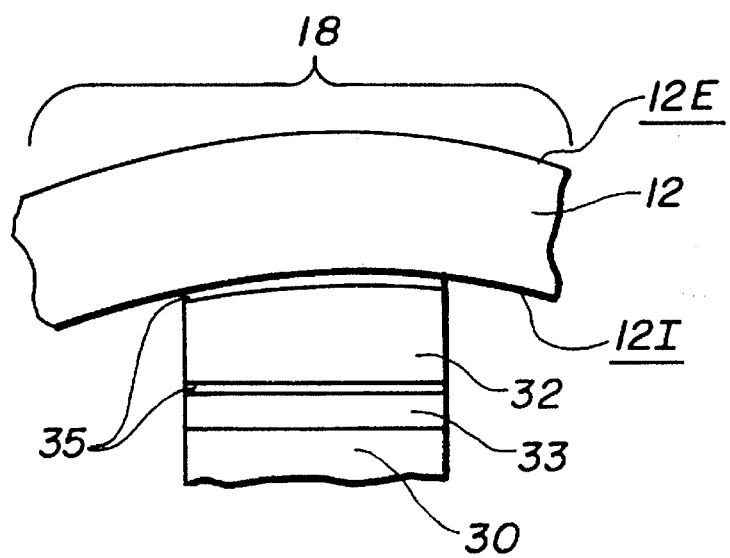
FIG. 6A is an enlarged view of a portion of FIG. 6 illustrating the attachment of the sample carrier to the band and the structure of the load transition pad.

In FIGS. 4 through 7 the sample carriers 30 are fabricated from a molded plastic material. In these same Figures (as well as FIGS. 8 and 9) the load transition pads 32 are formed from a molded elastomeric material such as polyurethane. As seen in FIG. 6A the pad 32 is attached to the interior surface 12I of the band 12 using an adhesive layer 35 similar to the adhesive layer 21. A composite member 33 is attached to the radially inner surface of the pad 32 by another similar adhesive layer 35. The radially inner surface of the composite member 33 is flat, while the radially outer surface of the pad 32 conforms in shape to the interior surface 12I of the band 12 in the load accepting region 18 where the pad is mounted. The sample carrier 30 may be attached to the member 33 using another layer 35 of adhesive, or the carrier 30 may be nested between the hub 16 and the member 33.

Figure 8:
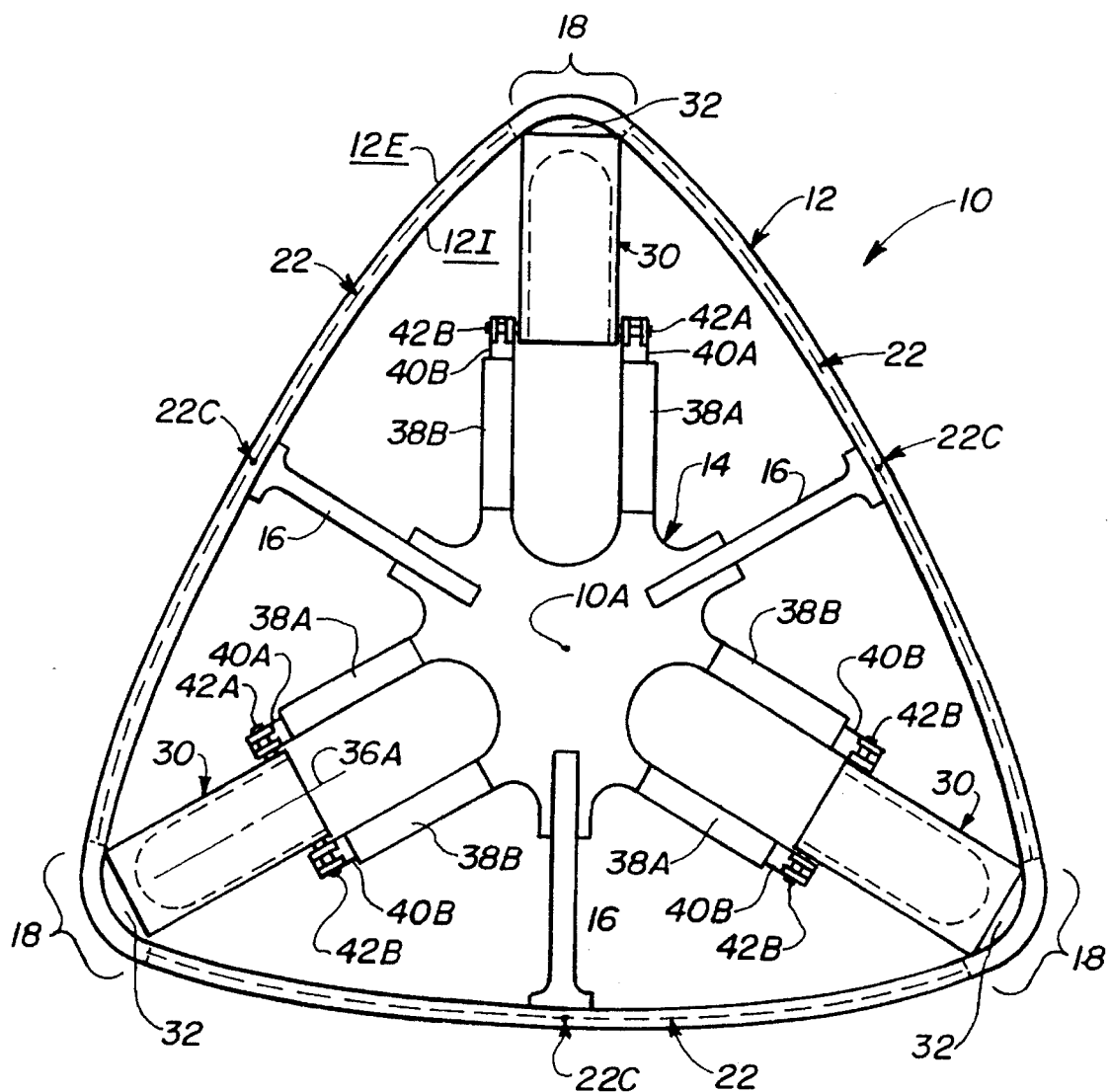
FIG. 8 and 9 are, respectively, a plan view and an isometric view illustrating a swinging bucket centrifuge rotor having an applied load accepting band in accordance with the present invention.
Figure 9:
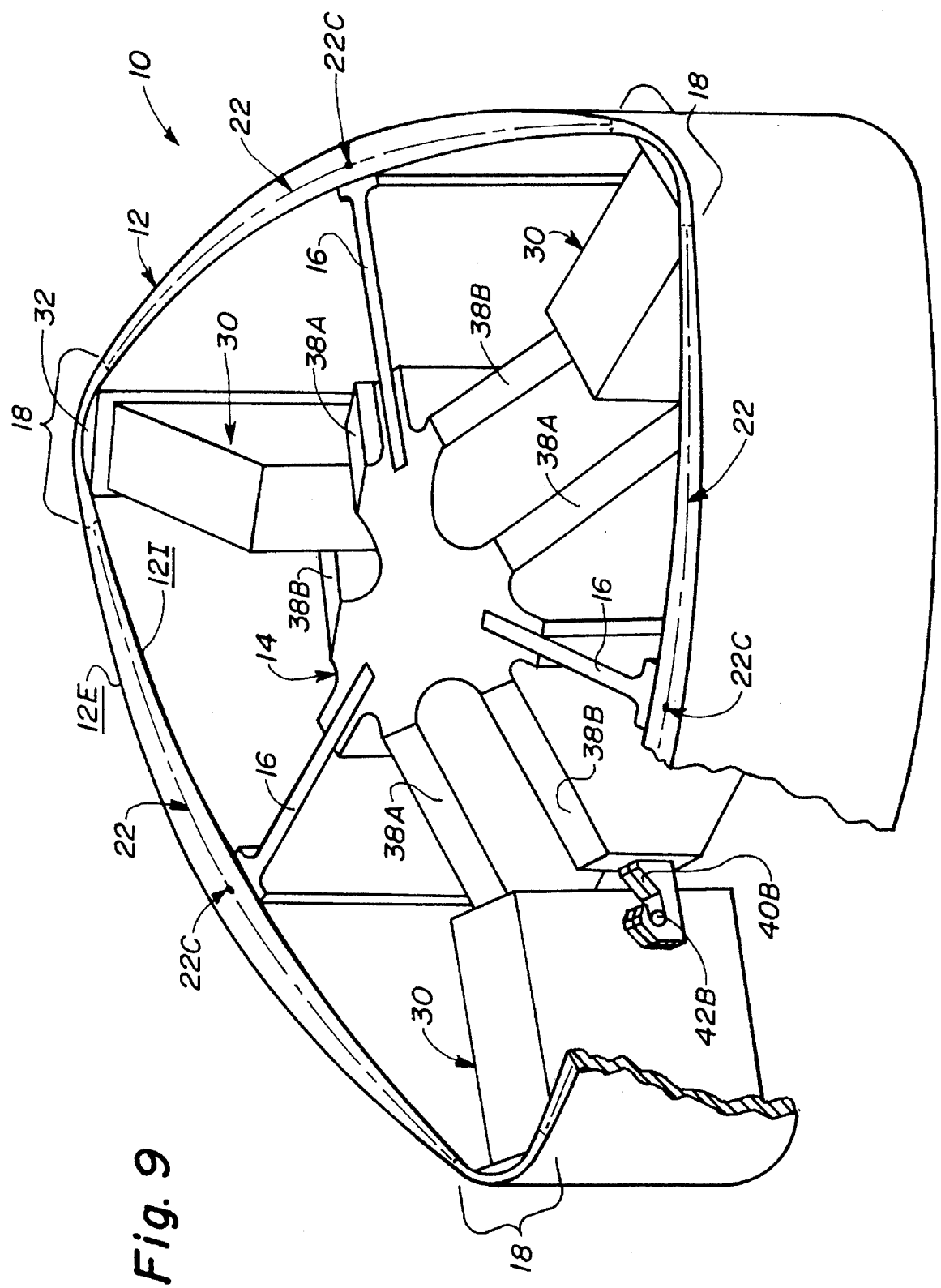

As yet another alternative, as seen in FIGS. 8 and 9, the sample carriers 30 may be of the swinging type. To this end, the carriers 30 are thus pivotally mounted to the hub 14 so that during centrifugation the axis 36A of the cavities 36 move from a first, generally vertical, position to a second position. In the second position the axis 36A of each cavity 36 in the sample carrier 30 lies in a plane generally perpendicular to the axis of rotation 10A. Moreover, means 38 are provided whereby the end of the sample carrier 30 moves radially outwardly to its supported position against the pad 32 located in the applied load receiving region 18 on the band 12.

The pivotal mounting of the carrier 30 with respect to the hub 14 may be effected in a variety of ways. In the embodiment shown in FIGS. 8 and 9, the hub 14 is provided with angularly spaced pairs of radially extending arms 38A, 38B. Each arm 38A, 38B has a slot 40A, 40B therein that serves to accept a trunnion pin 42A, 42B disposed on the carrier 30. Of course the arms 38A, 38B could each carry a trunnion pin that is received in the carrier 30.

In the rotor heretofore discussed the struts 16 are attached to the interior surface of the band 12 at the midpoints of the band 12 between load accepting regions 18. The connection of the struts 16 to the band 12 is effected using the elastomeric sheet 17 and the layer 19 of composite material disposed between the radially outward end of the struts 16 and the interior surface 12I of the band 12. These layers accommodate shear and transverse stress resulting from relative movement between the band and the strut.

The relative motion between the band 12 and the strut 16 is the result of two actions. First, the band stretches during operation due to the tensile loading it supports, while the connection surface of each strut remains the same circumferential length as at rest. The change in length of one surface with respect to the other connected surface causes this relative movement. Second, any difference in the load applied at adjacent load accepting regions tends to change the shape of the band. The strut 16, attached to the midpoint of the band 12 between the load accepting regions 18, resists this change of shape. The resistance of the strut 16 to the change of shape of the band 12 leads both to shear at the connection of the strut to the band and to bending of the strut towards the larger load. Normal variances in the volumes of sample from one sample carrier to another can lead to this difference in loading.

FIGS. 11 and 12 are, respectively, a plan and a vertical cross-sectional view of a rotor 10' in which such shear and bending in the struts 16 are eliminated. The rotor 10' has a peripheral load accepting band 12 in accordance with the present invention. The band 12 again has a predetermined thickness associated therewith and his an interior surface 12I and an exterior surface 12E thereon. The composition and thickness of the band are determined by identical considerations as were developed previously. An alternate form of load accepting band 12' is illustrated and discussed in connection with FIG. 13.

The rotor 10' includes a central hub portion 14 having a mounting recess 15 formed therein by which the hub 14 may be connected to a suitable motive source. An axis of rotation 10'A extends through the central hub portion 14. A plurality of struts 16 extends radially outwardly from the hub 14. Similar to the embodiment previously described, the hub 14 and struts 16 are made from a composite material, such as a reinforced plastic, although they may be formed of metal.

The band 12 has a plurality of angularly spaced, applied load accepting regions 18 defined thereon. These regions 18 are those locations where sample carriers 30 or load transition pads 32 (FIGS. 17 and 18, for swinging bucket rotors) are attached to the interior surface 12I of the band 12. In a plane perpendicular to the axis 10'A, that is, the plane of FIG. 11, adjacent applied load accepting regions 18 are spaced apart a predetermined angular distance (2Θ). The angle (2Θ) is related to the number N of sample carriers 30 or load transition pads 32 disposed on the rotor 10'. The angular distance (2Θ) in degrees is equal to 360 divided by N.

The sample carriers 30 and the load transition pads 32 are attached to the band 12 at the load accepting regions 18. However, in accordance with the embodiment of the rotor shown in FIGS. 11 through 18, the struts 16 are connected to sample carriers 30 or to the load transition pads 32, as the case may be. Thus, the radially outward ends of the struts 16 lie at the load accepting regions 18. In the rotor shown in FIGS. 1 to 10 the radially outward ends of the struts 16 are attached to the band 12 at the midpoint thereof between adjacent load accepting regions 18.

Identical to the rotors previously described (FIGS. 1 to 10), when removed from the struts 16 and viewed in the plane perpendicular to the axis 10'A, the applied load accepting band 12 has a shape that follows the predetermined equilibrium curve 22 between adjacent load accepting regions 18. The shape of the equilibrium curve 22 from the midpoint 22C to a point adjacent the nearest applied load accepting region 18 is defined by the relationships of Equations (1) and (2).

Figure 18:
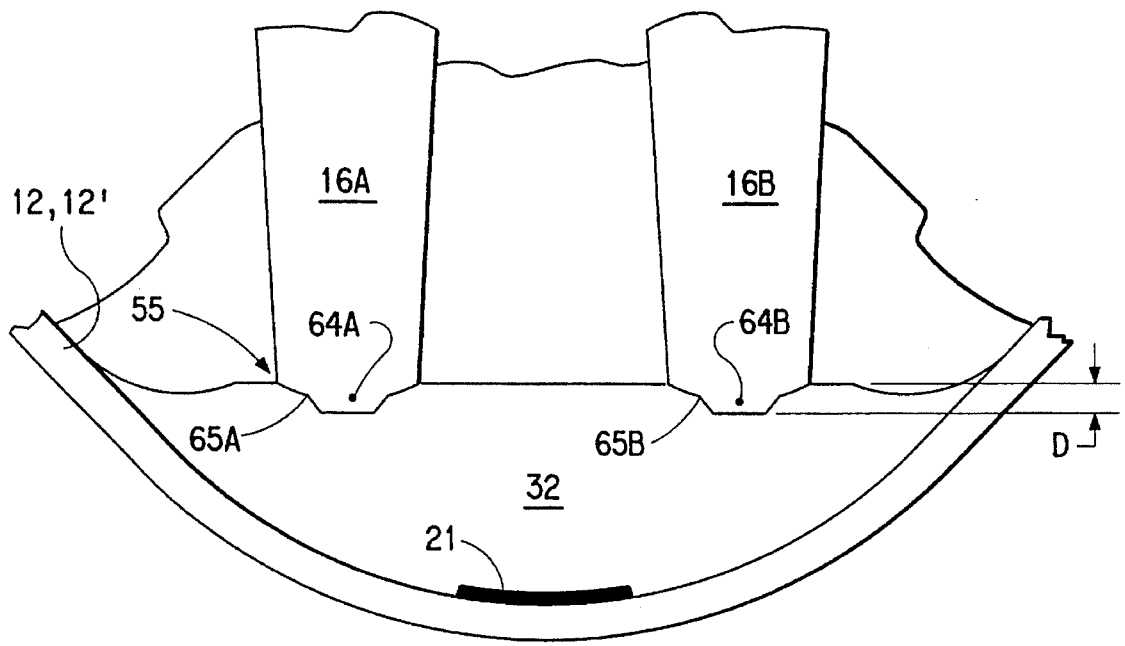
FIG. 18 is an enlarged view of a portion of the rotor shown in FIG. 17 illustrating the attachment of the load transition pad to the band at an applied load accepting region thereof and of the attachment of the strut to the load transition pad.
Figure 17:
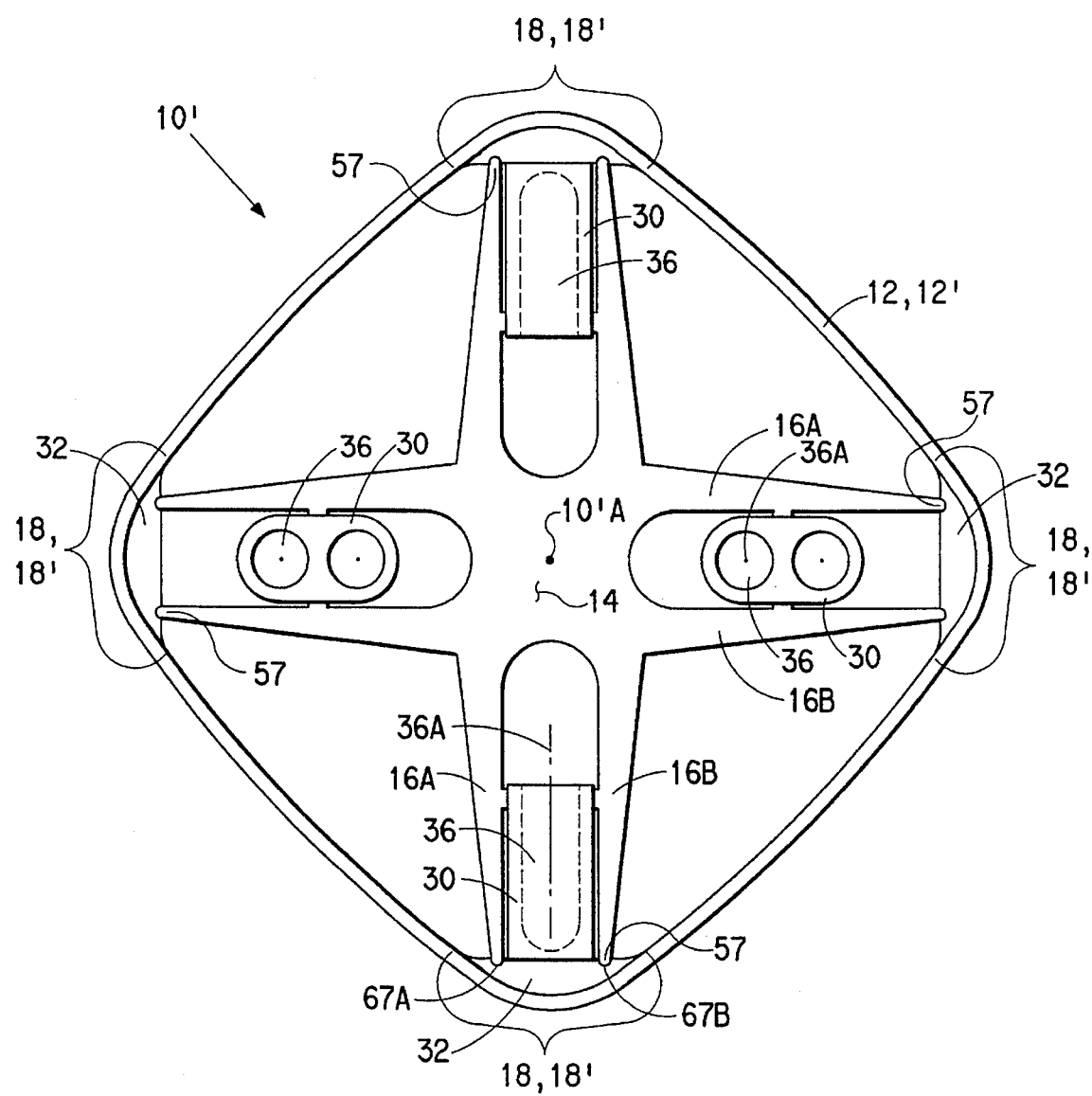
FIG. 17 is a plan view illustrating a swinging bucket centrifuge rotor having an applied load accepting band as shown in either FIG. 11 or in FIG. 13, with load transition pads being disposed at the load accepting regions of the band.

Each strut 16 is mounted to the band 12, 12' at an applied load accepting region through a connection 55 which is preferably incapable of supporting a tension load. The connection 55 is able to support compression and transverse loads. In the embodiment of FIGS. 11 to 16 the connection of the struts 16 to the band 12, 12' is implemented through the interface 57 between the struts 16 and the sample carriers 30. In the embodiment of FIGS. 17 and 18 the connection is implemented through the interface 57 between the struts 16 and the pads 32. The interface 57 between the struts and the carriers 30 or the pads 32, as the case may be, in the preferred case supports compression but not tension. The advantage of such an interface 57 which can support only compression is described later.

In order to insure that the end of the strut 16 and the sample carrier 30 or the pad 32 remain in contact during normal operation of the rotor, the design equilibrium curve of the band 12, 12' is selected such that the inside surface of the sample carrier 30 or the pad 32 does not lie radially outside of the location of the end of the strut 16 at design speed. If the design location of the sample carrier 30 or the pad 32 exactly matches the design location of the end of the strut then there will be neither a separation between the strut 16 and the carrier or the pad nor a compression load on the strut at design speed and loading conditions. In the preferred case, as is developed below, the design equilibrium curve is selected such that the compressive load approaches zero at the design speed and at design loading conditions.

The struts 16 are in the preferred case pre-loaded by the band 12 when the band 12 is assembled on the struts 16. In the thus assembled rotor 10', the magnitude of this compression force is a maximum while the rotor is at rest and a minimum, preferably approaching zero, when the rotor is at its design speed. The diminution in compression occurs as the band approaches the design equilibrium shape.

Figure 14:
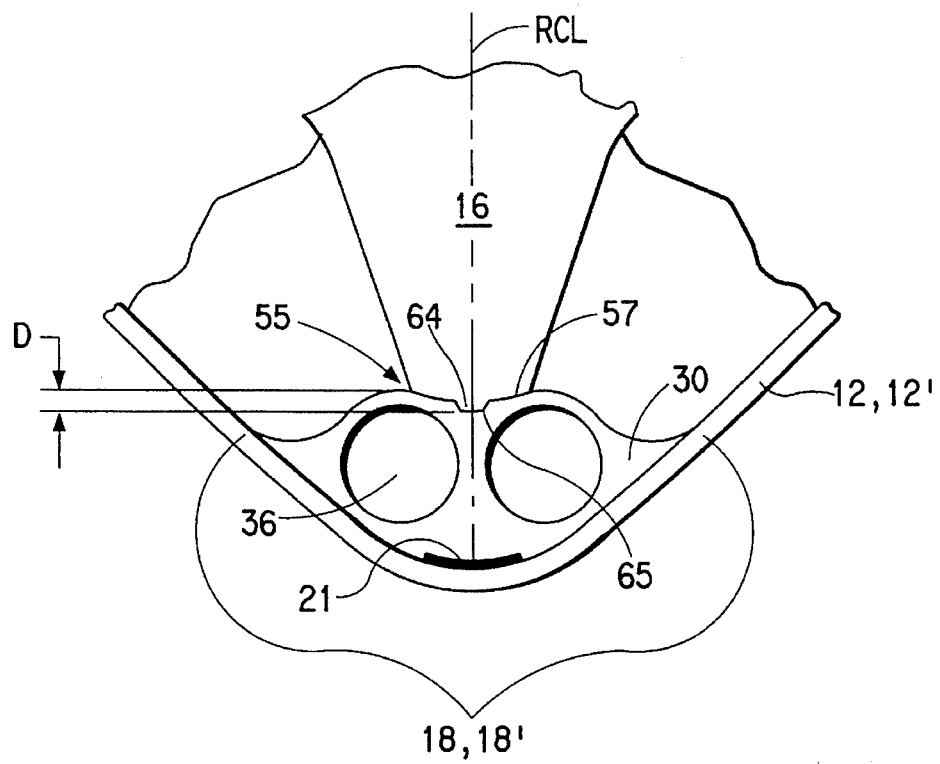
FIG. 14 is an enlarged view of a portion of the rotor shown in both FIGS. 11 and 13 illustrating the attachment of a sample carrier to the band at an applied load accepting region thereof and of the attachment of the strut to the sample carrier.

Providing an interface 57 between the strut 16 and the sample carrier 30 or the pad 32 which supports only compression (i.e., is not able to support a tension load) provides the advantage of limiting the top speed physically attainable by the rotor to a predetermined safe level. As noted, the pre-load compression applied by the band 12, 12' on the struts 16 can be controlled through the band design to approach zero at the design speed. Should, due to operator or machine error, the rotor be accelerated to a speed higher than the rated speed, the compression force will disappear and a gap between the strut 16 and the sample carrier 30 or the pad 32 will form. Referring to FIGS. 14 and 18, should this gap exceed the interference distance D between the strut 16 and the sample carrier 30 or the pad 32, the strut 16 will no longer be capable of accelerating the rotor to a higher speed. As a result the possibility of an extreme overspeed condition with the associated high energy levels and possible safety hazards is eliminated.

The sample carriers 30 and the load transition pads 32 are constructed of a material that is preferably light in weight and of a high compressive strength. Suitable for use in constructing the carriers 30 and the pads 32 is a graphite filled thermoplastic material such as the synthetic thermoplastic resins for molding and extrusion purposes sold under the Registered Trademark NORYL GTX owned by General Electric Corporation. The compressive strength of the material used to form the carriers 30 or the pads 32 must be high enough to support the compressive pre-load that is exerted on these members. High compressive strength is also required to support the load exerted by any sample on the sample carriers 30 during centrifugation. Light weight is preferable in order to minimize the load exerted by the sample carriers 30 (and the load transition pads 32 in the swinging bucket case) on the band 12, 12' during operation of the rotor 10'.

Each sample carrier 30 may be provided with one or more cavities 36 which can support one or more sample containers. Conventional rotors have equally spaced sample containers around the rotor. (The angular distance between each of C containers is equal to 360 degrees divided by C.) In the rotor 10, 10' of the present invention, where two or more containers can be accommodated in each sample carrier 30 (for example, FIGS. 11 and 12) the container(s) are clustered in the load accepting regions 18, 18' of the band 12, 12'.

In an assembled rotor the sample carriers 30 and the load transition pads 32 may be held in place between the end of the struts 16 and the interior surface of the band 12, 12' only by the compression force exerted by the pre-loaded band. However, in practice, it may be desirable to dispose a narrow stripe 21 of adhesive between the sample carriers 30 or the load transition pads 32 and the band 12, 12'. In FIG. 14 the stripe 21 of adhesive is shown as a thickened line. The stripe 21 of adhesive should lie along the radial centerline RCL, of the load accepting regions 18, 18'. The adhesive holds the sample carriers 30 or the load transition pads 32 in place against the band 12, 12' prior to mounting the band on the struts. The adhesive should not extend over the entire interface between the sample carriers 30 or the load transition pads 32 and the band 12, 12' due to the tendency of the adhesive to inhibit relative motion between the adhered member and the band during centrifugation, therefore introducing additional stress into the band.

With a band 12 that exhibits a shape defined by the relationships of Equations (1) and (2) a pre-load may be obtained by stretching the band 12 elastically to move the load accepting regions 18 radially outwardly relative to the geometric center of the band 12. The hub 14 and the struts 16 are then inserted into position within the stretched band 12. When positioned the externally applied stretching force is released and the band 12 closes upon the struts 16.

The preload is desirable to insure that the rotor 10' has satisfactory structure and stiffness when assembled, and that the rotor 10' is tolerant to differential fill volumes in the sample containers processed in the rotor 10'. This tolerance is accomplished by differential compression in the struts when the rotor 10' is operating.

Similar to the band shown in FIGS. 1 through 10, in the assembled, but at rest condition, the preloaded band 12 will slightly deviate from (i.e., lie slightly inside of) the shape defined by the equilibrium curve of Equations (1) and (2). Thus the band 12 will be subject to bending stress while at rest. However, when rotated to speed the band will reassume the shape of the equilibrium curve of Equations (1) and (2) and, for the same reasons as developed earlier, is then loaded only in tension.

In addition to the methods heretofore described, the shape of the band 12 may be verified while running to correspond to that defined by the equilibrium curves of Equations (1) and (2) by use of a photographic technique. The rotor is rotated at its design speed with the sample carriers 30 carrying the maximum rated (i.e., design) load in a centrifuge fitted with a clear lid. A camera, such as thirty-five millimeter camera, is mounted directly above the rotor, centered on the axis of rotation 10'A. One or more flash units, each for example having a maximum flash duration of 0.5 microseconds, are mounted to illuminate the rotor when the flash unit(s) are activated by the camera shutter release. A photograph is exposed, capturing the image of the spinning rotor on high speed film. The shape of the band 12 on this photograph can then be compared to the equilibrium curve defined by Equations (1) and (2) for the parameters of the band and its loading conditions.

A band 12 that exhibits a variable cross section (governed by Equations (1A), (2A) and (3A)) may be analagously constructed, with the struts 16 thereof abutting against the sample carriers 30 or the transition pads 32, as the case may be, in the vicinity of the load accepting regions 18.

In practice, depending on the stiffness of the band and the top rated speed of the rotor, it may be impractical to stretch a band 12 that satisfies the relationship defined in Equations (1) and (2) sufficiently to obtain the desired pre-load. In this instance an alternative approach is to use a band 12' which when removed from the struts has a shape that deviates from the equilibrium curves that are defined by Equations (1) and (2).

Figure 13:
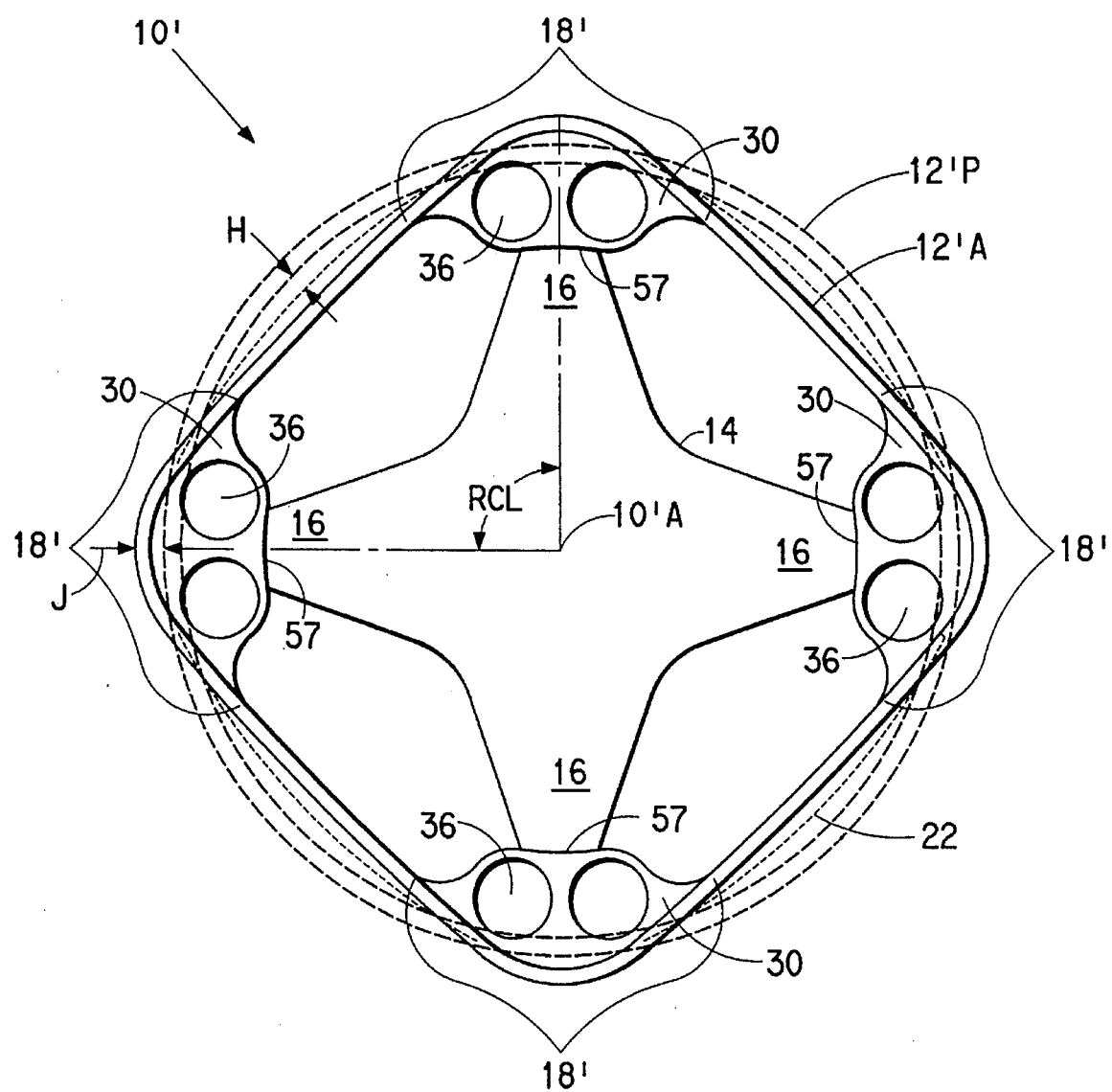
FIG. 13 is a plan view of a centrifuge rotor in which the sample carriers of the vertical type are disposed at the load accepting regions of an alternate form of applied load accepting band and in which mounting struts are disposed at load accepting regions, with the preassembled shape of the band being shown in dashed lines, the mounted shape of the band being shown in solid lines, and the equilibrium shape of a band shown by dotted lines.

FIG. 13 illustrates a rotor 10' having struts 16 which align with the load accepting regions and that uses such an alternative band 12'. Prior to assembly onto the struts 16 the band 12' is shown in dash lines 12'P, while the shape of the band 12' when mounted on the struts 16 and with the rotor 10' at rest shown in solid lines 12'A. The equilibrium curve 22 of Equations (1) and (2) is superimposed in FIG. 13 by dotted lines.

Measured along the neutral axis of the preassembly band 12'P (or the centroidal axis of the cross sectional area of the band) between the radial centerlines RCL of the load accepting regions the pre-assembly band 12'P extends for a predetermined distance $L_{actual}$. When the band 12' is assembled on the rotor 10' the length $L_{actual}$ of the pre-assembly band 12'P is equal to the length $L_{assembled}$ of the band 12'A. The distance $L_{assembled}$ is substantially equal to a predetermined distance $L_{equilibrium}$ defined between the radial centerlines of the load accepting regions of a band that follows the equilibrium curve of Equations (1) and (2) between the load accepting regions. By "substantially equal" it is meant that the distance $L_{assembled}$ lies within 1.5% to 2% of the distance $L_{equilibrium}$.

The shape of the pre-assembly band 12'P must deviate from the shape defined by the equilibrium Equations (1) and (2) in order for the band 12' to provide the desired compressive pre-load after assembly. Between the load accepting regions 18' the pre-assembly band 12'P bows radially outwardly from the shape of the equilibrium curve 22. The maximum radial deviation occurs midway between the load accepting regions 18' and is indicated by the reference character H on FIG. 13. In the load accepting regions 18' the contour of the band 12'P bows radially inwardly a corresponding distance J sufficient to maintain the equality of distances $L_{actual}$ and $L_{assembled}$.

Upon assembly, the load accepting regions 18' of the band 12'A are held radially outwardly the distance J by the struts 16. The shape of the band 12'A on the assembled rotor between the load accepting regions 18' changes to lie inside of and approximate the equilibrium curve 22. The distance J, and thus the corresponding distance H, is determined by the amount of pre-load necessary to insure that the rotor 10' has satisfactory structure and stiffness when assembled, and that the rotor 10' is tolerant to differential fill volumes in the sample containers processed in the rotor 10'.

The amount of preload that is exerted on the struts 16 by the band 12' is a function of the distance J that the load accepting regions 18' of the band 12'A lie radially outward of the corresponding load accepting regions 18' of the preassembly band 12'P. It should be noted that the magnitude of the preload can be significantly less than the magnitude of the tension in the band during operation, and need only be as high as is required to accomplish the functions described. Regardless of the preload selected, the band will tend to take the shape of the design equilibrium curve when operating and the compression force in the struts will approach the predetermined value which is zero in the preferred case.

This degree of control of the strut compression when the rotor is operating is only possible with a tension band rotor where the band closely approximates a design equilibrium shape defined by Equations (1), (2) or Equations (1A), (2A) and (3A) when operating. Since the band will always approach a known shape the radial location of the sample carriers 30 or pads 32 at design speed is defined independently of the preload. The equilibrium curve the rotor is designed to meet is therefore selected such that the radial location of the sample carrier or pad is matched to the predicted radial location of the end of the strut 16 such that the compressive loading and the strut and the sample carrier or the pad is approaching zero at speed. The predicted radial location of the end of the strut 16 is determined from the initial length of the strut plus the increase in length due to its own body forces under centrifugation.

The above-described change in the shape of the band 12' from its preassembled shape 12'P to its assembled (but at rest) shape 12'A introduces some bending stress into the band 12'. During operation the shape of the band further changes to approach and (when at design speed) closely approximate the equilibrium shape as defined by Equations (1) and (2).

To verify that the the rotor at operating speed closely approximates the design equilibrium shape as defined by Equations (1) and (2), the photographic technique described above may be used.

Because the shape of the band in operation is different than the shape of the pre-assembly band 12'P the band is loaded by a predetermined total stress that is due both to bending and to pure tension. The stress due to pure tension is at least 90%, and more preferably, 95%, of the total stress in the band.

The same considerations as set forth in this section for a constant cross section band apply with equal efficacy to a variable cross section band, i.e., a band that complies with Equations (1A), (2A) and (3A).

However the band is configured to provide the preload, the interfaces 57 between the struts 16 and the sample carriers 30 or the transition pads 32 must support the compressive pre-load from the band 12 or 12'. Additionally the interfaces 57 must be able to transmit torque from the hub 14 to the sample carriers 30 or the transition pads 32 and thus to the band 12, 12'.

In FIG. 11 the interface 57 between the strut 16 and a sample carrier 30 has an arcuate shape providing a simple interface geometry that is capable of positively transmitting torque. In FIG. 14 interface 57 between the strut 16 and the sample carrier 30 takes the form of a tongue-in-groove arrangement. A projection 64 on the end of the strut 16 engages a groove 65 in the sample carrier 30 or the in order to provide positive torque transmission from the strut 56 to the sample carrier 60.

Similar arrangements may be used to transmit torque from the strut 16 to the load transition pads 32 for the case of a swinging bucket rotor. However, in the case of a swinging bucket rotor the end of each strut 16 is split to define two trunnion arms 16A, 16B. The end of each arm may be arcuately shaped to engage a respective correspondingly shaped recess 67A, 67B in the pad 32. This arrangement is illustrated in FIG. 17. Alternatively, the end of each arm 16A, 16B may be provided with a respective projection 64A, 64B. Each projection 64A, 64B engages a corresponding respective groove 65A, 65B in the pad 32.

Having the struts 16 extending radially outwardly to support the sample carriers 30 or the pads 32 in the load accepting regions 18, 18' eliminates shear and transverse stresses resulting from relative motion between the band 12, 12' and the end of the struts. This is most beneficial in the case of a significant out-of-balance condition during rotor operation. An out-of-balance condition can exist from differential fill volumes in the sample containers processed in the rotor or the absence of one or more container(s) from the complement able to be processed by the rotor 10'. Differential loading between sample carriers 30 is accommodated by differential compression loading in the struts 16. Because the struts align with the line of action of the centrifugal force acting on the sample carriers no shear or transverse load is introduced to the struts.

—o—0—o—

The sample carriers 32 used in the rotors 10' of FIGS. 11 through 13 are generally similar to those discussed in connection with FIGS. 4 through 9.

More particularly, FIGS. 11 and 13 are plan views and FIG. 12 is a vertical cross section view showing a rotor 10' having sample carriers 30 in which the axis 36A of each sample receiving cavity 36 is parallel to the axis of rotation 10'A of the rotor 10'. These Figures are similar to FIGS. 6 and 7.

FIGS. 15 and 16 illustrate a plan and a vertical cross section view of a rotor 10' having a band 12, 12' in accordance with the present invention in which the sample carriers 30 are configured to define a fixed angle rotor. Thus, the axes 36A of the sample cavities 36 in the sample carriers 30 are inclined with respect to the axis of rotation 10'A of the rotor 10'. These Figures are similar to FIGS. 4 and 5.

As yet another alternative, as seen in FIG. 17, the sample carriers 30 may be of the swinging type. To this end, the carriers 30 are thus pivotally mounted to the arms 16A, 16B of the struts 16 so that during centrifugation the axis 36A of each cavity 36 in the sample carriers 30 moves from a first, generally vertical, position to a second, generally horizontal, position. In the second position the axis 36A of the sample carrier 30 lies in a plane generally perpendicular to axis of rotation 10'A of the rotor 10. Strictly for illustrational purposes, two of the sample carriers 30 are shown in the first position and the other two carriers are shown in the second position. Moreover, means are provided whereby the end of the sample carrier 30 may move radially outwardly to its supported position against the load transition pad 32 located in the applied load accepting region 18 on the band 12.

As an alternative manufacturing technique to that earlier described, it may be convenient to properly position the sample carriers 30 or the load transition pads 32, as the case may be, in cavities within the mandrel. The outside surface of the sample carriers 30 or the pads 32 thus become part of the shape of the mandrel that defines the inside surface 12I, 12'I of the band 12, 12'. The stripe 21 of adhesive is applied to the sample carriers 30 or the pads 32. The band 12, 12' is then formed by filament winding using either tow or tape on the mandrel. Alternatively, a resin that adheres to the material of the sample carrier 30 may be used as the resin of the band 12, 12'. Prior to winding the band 12, 12' the outside surface of the carrier 30 is masked with a suitable release agent leaving only the areas desired to be bonded (the narrow stripe described before).

The struts 16 are mounted to the sample carriers 30 or the pads 32, as the case may be, by an interference fit. This is accomplished by straightening the band 12, 12' between the load accepting regions 18, 18' by simply squeezing the band 12, 12' inward midway between the load accepting regions using appriorately shaped jaws. This, in effect, moves the sample carriers 30 or the pads 32 outwardly, allowing the hub 14 and the struts 16 to be inserted. The properly preloaded, assembled band results upon removal of the jaws.

Those skilled in the art, having the benefits of the teachings of the present invention as hereinabove set forth, may effect numerous modifications thereto. However, such modifications lie within the contemplation of the present invention, as defined by the appended claims.

APPENDIX

With reference to the free body diagram of FIG. 3A, the derivation of the sets of Equations 1, 2 and 1A, 2A and 3A for the equilibrium curve, and thereby the shape, of a band 12 may be understood. In FIG. 3A a portion of the band 12 between the midpoint 22C of the equilibrium curve 22 and a predetermined endpoint 22L-2 is shown. The reference axes for a Cartesian and a polar coordinate system are also shown. In the derivation the endpoint 22L-2 is located on the band 12 at the load accepting region 18-2 (FIG. 1) and the load accepting region is depicted as the point through which the applied load may act. In the actual band the load accepting region extends for some finite distance on the band. The radii of the band at these respective points is indicated by the characters $R_O$ and $R_L$, respectively. The angular distance between any radius R and the radius $R_O$ is indicated by the angle $\Theta$. The portion of the equilibrium curve 22 not shown in FIG. 3A between the midpoint 22C of the equilibrium curve 22 and the endpoint 22L-1 is symmetric to the portion of the equilibrium curve shown in FIG. 3A.

The free body diagram illustrates the forces acting on the band 12 while the same is spinning. In accordance with the present invention the band 12 has the same shape both while at rest and while spinning. The shape of the band is such that while the band is spinning it is subjected only to a tension force. Stated alternatively, when spinning the tension in the band balances the centrifugal force on the band due to its mass and the load on the band at the load accepting regions.

As seen in the free body diagram each end of the segment of band has a tension force imposed thereon. The forces are indicated by the characters $T_0$ and T, respectively, which designate the tension forces in the band at the midpoint 22C and the endpoint 22L-1. The magnitude of the indicated tension forces on the band inherently includes the loading on the band due to the weight of the sample and the sample carrier. The centrifugal force acting on the center of mass of the band is indicated by the character F.

Summing forces in the x direction and thereafter differentiating produces the following:

$$\Sigma F_x = 0$$

$$F_x + T_x - T_0 = 0$$

$$F_x = T_0 - T_x$$

$$dF_x = -dT_x \qquad (A)$$

Similarly summing forces in the y direction and thereafter differentiating produces the following:

$$\Sigma F_y = 0$$

$$F_y - T_y = 0$$

$$F_y = T_y$$

$$dF_y = dT_y \qquad (B)$$

As seen from FIGS. 3B and 3C, if the mass of a differential segment ds of the band is dm, if its cross sectional area is A, if its angular speed is $\omega$ and if its density is $\gamma$, the differential centrifugal force dF on the differential segment of the band may be expressed as $$dF = R \omega^2 \, dm \qquad (C)$$

Substituting the expression $(\gamma A \, ds)(1/g)$ for the differential mass dm, Equation (C) becomes $$dF = (\gamma A \omega^2)(1/g)(R \, ds) \qquad (D)$$

From FIG. 3C, similar triangles yields $$dF/dF_x = R/x; \quad dF/dF_y = R/y$$

and $$dF_x = dF(x/R); \quad dF_y = dF(y/R) \qquad (E)$$

From Equations (D) and (E) the components of dF are:

$$dF_x = (\gamma A \omega^2)(1/g) \, x \, ds \qquad (F)$$

$$dF_y = (\gamma A \omega^2)(1/g) \, y \, ds \qquad (G)$$

From Equations (A) and (F)

$$dT_x/ds = -(\gamma A \omega^2)(1/g) \, x \qquad (H)$$

and from Equations (B) and (G)

$$dT_y/ds = (\gamma A \omega^2)(1/g) \, y \qquad (I)$$

From the free body diagram of FIG. 3A $$T^2 = T_y^2 + T_x^2$$

Differentiating and dividing by two yields $$T \, dT = T_y \, dT_y + T_x \, dT_x$$

$$T \, dT = T_x \, [(T_y/T_x) \, dT_y + dT_x] \qquad (J)$$

Since the vectors ds and T both have the same direction (perpendicular to the endface of the segment of the band) similar triangles in FIG. 3A yield $$(T_y/T_x) = -(dy/dx); \quad T_x = T(dx/ds) \qquad (K)$$

Substituting Equation (K) into Equation (J)

$$T \, dT = T(dx/ds) \, [-(dy/dx) \, dT_y + dT_x] \qquad (L)$$

Simplifying Equation (L)

$$dT = -(dT_y/ds) \, dy + (dT_x/ds) \, dx \qquad (M)$$

From Equations (H) and (I)

$$dT = -[(\gamma A \omega^2)(1/g) \, y] dy + [(\gamma A \omega^2)(1/g) \, x] \, dx \qquad (N)$$

and $$dT = -(\gamma A \omega^2)(1/g) \, (y \, dy + x \, dx) \qquad (O)$$

Assuming a constant cross-section for the band, integrating Equation (O) over the limits $T_0$ to T yields $$T-T_0=-(\gamma A \omega^2) (1/2 g) (y^2-R_0^2+x^2) \quad (P)$$

Noting from FIG. 3C that $(y^2+x^2)=R^2$, Equation (P) becomes $$T-T_0=-(\gamma A \omega^2) (1/2 g) (R^2-R_0^2) \quad (Q)$$

and factoring $R_0^2$ from Equation (Q) and rearranging yields $$T=T_0-[(\gamma A \omega^2) (1/2 g)] R_0^2 [(R/R_0)^2-1] \quad (R)$$

Dividing Equation (R) by $T_0$, remembering that a constant cross section band is assumed, and noting that the stress is tension per unit area (i.e., $\sigma_0=T_0/A_0$), Equation (R) becomes $$T/T_0=1-[(\gamma \omega^2 R_0^2) (1/2 g) (1/\sigma_0)] [(R/R_0)^2-1] \quad (S)$$

and $$T/T_0=1-\{K/2 [(R/R_0)^2-1]\} \quad (T)$$

where $$K=[(\gamma \omega^2 R_0^2) (1/g) (1/\sigma_0)] \quad (2)$$

From the free body diagram of FIG. 3A, summing moments about the origin $$T_0 R_0 = T_\Theta R \quad (U)$$

$$T_\Theta/T_0 = R_0/R \quad (V)$$

In FIG. 3A, the force triangle of the vector T yields, $$T_R^2 + T_\Theta^2 = T^2$$

Rearranging and dividing by $T_0^2$ $$(T_R/T_0)^2 = (T/T_0)^2 - (T_\Theta/T_0)^2 \quad (W)$$

Inserting Equations (V) and (T) into Equation (W) yields $$(T_R/T_0)^2 = (1-\{K/2 [(R/R_0)^2-1]\})^2 - (R_0/R)^2$$

and $$(T_R/T_0) = \text{RAD} (1-\{K/2 [(R/R_0)^2-1]\})^2 - (R_0/R)^2 \quad (X)$$

Multiplying the right hand side of Equation (X) by $R/R_0$ and the left hand side by $(T_0/T_\Theta)$ (which from Equation (V) is equal to $R/R_0$) yields $$(T_R/T_\Theta) = (R/R_0) \text{RAD} (1-\{K/2 [(R/R_0)^2-1]\})^2 - (R_0/R)^2 \quad (Y)$$

Since the vector $R\, d\Theta$ and the vector $dR$ respectively extend in the same direction as the vectors $T_\Theta$ and $T_R$, respectively, similar triangles yields $$T_R/T_\Theta = dR/R\, d\Theta \quad (Z)$$

Multiplying the numerator and the denominator of Equation (Z) by $(1/R_0)$ yields $$T_R/T_\Theta = d(R/R_0)/[(R/R_0)\, d\Theta] \quad (AA)$$

Simplifying $$(R/R_0)(T_R/T_\Theta) = d(R/R_0)/d\Theta \quad (BB)$$

Therefore, for a band that exhibits a constant area, inserting Equation (Y) into Equation (BB)

$$d(R/R_0)/d\Theta = (R/R_0)^2 \text{RAD}(1\{K/2 [(R/R_0)^2-1]\})^2 - (R/R_0)^2 \quad (1)$$

where $$K=[(\gamma \omega^2 R_0^2) (1/g) (1/\sigma_0)], 0<K<1 \quad (2)$$

The constant K defines a shape factor K for each of the family of equations that satisfy the differential equation (1). Since the band is to be exposed only to a tensile force while spinning the shape factor K must limited within the range $0<K<1$. If K lies outside these limits an equilibrium condition is not possible. The physical explanation of the limits on K can be understood with reference to a consideration of the ranges of loads able to be accommodated by a band in accordance with the invention.

As seen in the drawing FIG. 3D the differential Equations (1) define a family of equilibrium curves. If the shape factor $K=1$, the equilibrium curve takes the form of a circle. However, a circular form for the equilibrium curve would mean that no component of band tension is available contribute to supporting a load applied to the band. A band subjected only to a tensile force while spinning would thus be able to accommodate zero load—an impractical result. Thus to support a load, a circular band must necessarily be subjected bending.

If the shape factor $K=0$, the equilibrium curve takes the form of a straight line. In this instance there is no component of band tension able to contribute to supporting the centrifugal force exerted on the mass of the band. Thus, a band having an equilibrium curve in the form of a straight line and being subjected only to a tensile force while spinning must have zero mass, a clearly absurd result.

Thus, a band in accordance with the present invention which is subjected only to tensile force while spinning must, of necessity, have a shape factor K that lies within the range $0<K<1$.

The equilibrium curve of any band in accordance with the present invention (that is, a band subjected only to tension while spinning) will exhibit an equilibrium curve between a midpoint of a band segment and the endpoint thereof (as these points are defined herein) that closely matches one of the family of equilibrium curves defined by Equations (1).

To determine that the equilibrium curve of a band as the same is used in an actual rotor the band is first removed from the struts that affix it to the hub. The contour of the actual band may then be plotted. The equilibrium curve extends through the center of the band. In an actual rotor, the angle $\Theta$ (in degrees) that the radius from the axis of rotation through the load point (the radius $R_L$), will be known from the relationship $$\Theta=360/(2N)$$

where N is the number of places on the rotor. Thus, one endpoint of the equilibrium curve of the actual rotor is the point on the band just adjacent to the load accepting region of the actual rotor. The midpoint of the band (the radius $R_O$), is typically (but not necessarily) the point at which the strut attaches to the band. If the band is exposed only to tension when spinning, the equilibrium curve of the band will closely match one of the family of equilibrium curves shown in FIG. 3D. That is, the equilibrium curve of the band from the actual rotor will fall on one of the family of curves in the range between $R_0$ and $R_L$ or will lie within a predetermined range of one of the family of equilibrium curves.

To verify that such a band is subjected to only a tensile force, a brittle lacquer test may be performed (preferably prior to the disassembly of the rotor from the struts, as discussed above). The brittle lacquer test is discussed in Richard C. Dove and Paul H. Adams, "Experimental Stress Analysis and Motion Measurement", Charles E. Merrill Books, Inc., Columbus, Ohio (1964). Other tests to verify that the band is subjected only to tensile forces could be performed. Such testing could include the mounting of strain gauges on inside and outside radial surfaces of the band.

Whereas in the earlier derivation Equations (1) and (2) it is assumed that since the cross section area A of the band (FIG. 3B) is constant, the tension and therefore the stress in the band varies. However, the invention can be implemented in a band in which the stress is constant and the opposite assumption, that the cross sectional area varies, is made.

For a band having a variable cross section and constant stress $$dT = -(\gamma A \omega^2)(1/g)(y\,dy + x\,dx) \quad (O)$$

Multiplying the numerator and denominator by 2, and again noting that the stress is tension per unit area (i.e., $\sigma = T/A$), $$dT = -(\gamma T \omega^2)(1/2g)(1/\sigma_0)(2y\,dy + 2x\,dx) \quad (CC)$$

Dividing by T and recognizing the derivatives of $y^2$ and $x^2$ in Equation (CC)

$$dT/T = -(\gamma \omega^2)(1/2g)(1/\sigma_0)(dy^2 + dx^2) \quad (DD)$$

Recognizing from FIG. 3C that $(dy^2 + dx^2) = d(R^2)$, $$dT/T = -(\gamma \omega^2)(1/2g)(1/\sigma_0)(dR^2) \quad (EE)$$

Integration of Equation (DD) over the limits $T_0$ to T (for the variable T) and $R_0$ to R (for the variable R) and factoring $R_0$ yields $$\ln(T/T_0) = -(\gamma \omega^2 R_0^2)(1/2g)(1/\sigma_0)[(R/R_0)^2 - 1] \quad (FF)$$

But, recognizing K from Equation (2), Equation (FF) becomes $$\ln(T/T_0) = -K/2\,[(R/R_0)^2 - 1] \quad (GG)$$

Taking the natural logarithm, $$(T/T_0) = \exp\{-K/2\,[(R/R_0)^2 - 1]\} \quad (HH)$$

Summing moments, and from Equations (W) and (V)

$$(T_R/T_0) = RAD\,(T/T_0)^2 - (R/R_0)^2 \quad (II)$$

From Equation (HH)

$$(T_R/T_0) = RAD\,\exp\{-K\,[(R/R_0)^2 - 1]\} - (R/R_0)^2 \quad (JJ)$$

Multiplying the right hand side of Equation (JJ) by $R/R_0$ and the left hand side by $(T_0/T_\Theta)$ (which from Equation (V) is equal to $R/R_0$) yields $$(T_R/T_\Theta) = (R/R_0)\,RAD\,\exp\{-K\,[(R/R_0)^2 - 1]\} - (R/R_0)^2 \quad (KK)$$

which is equivalent to $$(T_R/T_\Theta) = RAD\,[(R/R_0)^2]\,(\exp\{-K\,[(R/R_0)^2 - 1]\} - 1) \quad (LL)$$

From similar triangles Equations (Z) and (AA) become $$(T_R/T_\Theta) = d(R)/R\,d\Theta = d(R/R_0)/(R/R_0)\,d\Theta$$

$$d(R/R_0)/d\Theta = (R/R_0)(T_R/T_\Theta) \quad (BB)$$

Therefore, for a band exposed to a constant stress, but having a variable cross sectional area $$d(R/R_0)/d\Theta = (R/R_0)\,RAD\,[(R/R_0)^2]\,(\exp\{-K\,[(R/R_0)^2 - 1]\} - 1) \quad (1A)$$

$$K = [(\gamma \omega^2 R_0^2)(1/g)(1/\sigma_0)] \quad (2A)$$

$$(A/A_0) = \exp\{-(K/2)\,[(R/R_0)^2 - 1]\} \quad (3A)$$

What is claimed is:

1. A continuous band adaptable for use as an applied load accepting band in a centrifuge rotor, the band having a central rotational axis extending therethrough and at least a first and a second applied load accepting region defined thereon, characterized in that the band has an equilibrium curve defined between the applied load accepting regions, the equilibrium curve having a midpoint therealong, the distance in the plane perpendicular to the axis between the axis and the midpoint being defined by a predetermined reference line $R_0$, such that, in the plane perpendicular to the axis, at any angular position $\Theta$ from the reference line $R_0$, each point on the equilibrium curve between the midpoint thereof and a point adjacent to one of the applied load accepting regions lies a predetermined distance R from the axis, the distance R at the corresponding angular position $\Theta$ being defined by the relationship:

$$d(R/R_0)/d\Theta = (R/R_0)\,RAD[(R/R_0)^2]\,(\exp\{-K\,[(R/R_0)^2 - 1]\} - 1) \quad (1A)$$

$$K = [(\gamma \omega^2 R_0^2)(1/g)(1/\sigma_0)] \quad (2A)$$

$$(A/A_0) = \exp\{-(K/2)\,[(R/R_0)^2 - 1]\} \quad (3A)$$

where $\omega$ is the angular speed,
$\gamma$ is the density of the band,
g is the acceleration due to gravity,
$\sigma_0$ is the stress per unit area in the band,
A is the cross sectional area of the band,
$A_0$ is the cross sectional area of the band at the radius $R_0$, and where 0<K<1, the cross sectional area of the band varying at each point therealong intermediate the applied load accepting regions such that, when the band is rotated, it is loaded only by a tensile stress.

2. A centrifuge rotor comprising:

a hub having at least a first and a second strut;

a continuous band adaptable for use as an applied load accepting band mounted to the struts, the band having a central rotational axis extending therethrough and at least a first and a second applied load accepting region defined thereon, characterized in that the band, when it is removed from the struts by which it is attached to the hub and while the band is at rest, has an equilibrium curve defined between the applied load accepting regions, the equilibrium curve having a midpoint therealong, the distance in the plane perpendicular to the axis between the axis and the midpoint being defined by a predetermined reference line $R_0$, such that, in the plane perpendicular to the axis, at any angular position $\Theta$ from the reference line $R_0$, each point on the equilibrium curve between the midpoint thereof and a point adjacent to one of the applied load accepting regions lies a predetermined distance R from the axis, the distance R at the corresponding angular position $\Theta$ being defined by the relationship:

$$d(R/R_0)/d\Theta = (R/R_0) \, RAD[(R/R_0)^2] \, (\exp\{-K[(R/R_0)^2-1]\} -1) \quad (1A)$$

$$K = [(\gamma \omega^2 R_0^2)(1/g)(1/\sigma_0)] \quad (2A)$$

$$(A/A_0) = \exp\{-(K/2)[(R/R_0)^2-1]\} \quad (3A)$$

where $\omega$ is the angular speed,
$\gamma$ is the density of the band,
g is the acceleration due to gravity,
$\sigma_0$ is the stress per unit area in the band,
A is the cross sectional area of the band,
$A_0$ is the cross sectional area of the band at the radius $R_0$, and where 0<K<1, the cross sectional area of the band varying at each point therealong intermediate the applied load accepting regions such that, when the band is rotated, it is loaded only by a tensile stress.

3. A continuous band adaptable for use as an applied load accepting band in a centrifuge rotor, the band having a central rotational axis extending therethrough and at least a first and a second applied load accepting region defined thereon, the rotor having a hub having at least a first and a second strut, characterized in that the band, when it is removed from the struts by which it is attached to the hub and while the band is at rest, has an equilibrium curve defined between the applied load accepting regions, the equilibrium curve having a midpoint therealong, the distance in the plane perpendicular to the axis between the axis and the midpoint being defined by a predetermined reference line $R_0$, such that, in the plane perpendicular to the axis, at any angular position $\Theta$ from the reference line $R_0$, each point on the equilibrium curve between the midpoint thereof and a point adjacent to one of the applied load accepting regions lies a predetermined distance $R_{actual}$ from the axis, each distance $R_{actual}$ approximating a reference distance R, where the reference distance R at the corresponding angular position $\Theta$ is defined by the relationship:

$$d(R/R_0)/d\Theta = (R/R_0) \, RAD[(R/R_0)^2] (\exp\{-K[(R/R_0)^2-1]\}-1) \quad (1A)$$

$$K = [(\gamma \omega^2 R_0^2)(1/g)(1/\sigma_0)] \quad (2A)$$

$$(A/A_0) = \exp\{-(K/2)[(R/R_0)^2-1]\} \quad (3A)$$

where $\omega$ is the angular speed,
$\gamma$ is the density of the band,
g is the acceleration due to gravity,
$\sigma_0$ is the stress per unit-area in the band,
A is the cross sectional area of the band,
$A_0$ is the cross sectional area of the band at the radius $R_0$, and where 0<K<1, the cross sectional area of the band varying at each point therealong intermediate the applied load accepting regions such that, when the band is rotated, it is loaded only by a tensile stress.

4. A centrifuge rotor comprising:

a hub having at least a first and a second strut; and a continuous band adaptable for use as an applied load accepting band mounted to the struts, the band having a central rotational axis extending therethrough and at least a first and a second applied load accepting region defined thereon, characterized in that the band, when it is removed from the struts by which it is attached to the hub and while the band is at rest, has an equilibrium curve defined between the applied load accepting regions, the equilibrium curve having a midpoint therealong, the distance in the plane perpendicular to the axis between the axis and the midpoint being defined by a predetermined reference line $R_0$, such that, in the plane perpendicular to the axis, at any angular position $\Theta$ from the reference line $R_0$, each point on the equilibrium curve between the midpoint thereof and a point adjacent to one of the applied load accepting regions lies a predetermined distance $R_{actual}$ from the axis, each distance $R_{actual}$ approximating a reference distance R, where the reference distance R at the corresponding angular position $\Theta$ is defined by the relationship:

$$d(R/R_0)/d\Theta = (R/R_0) \, RAD[(R/R_0)^2](\exp\{-K[(R/R_0)^2-1]\}-1) \quad (1A)$$

$$K = [(\gamma \omega^2 R_0^2)(1/g)(1/\sigma_0)] \quad (2A)$$

$$(A/A_0) = \exp\{-(K/2)[(R/R_0)^2-1]\} \quad (3A)$$

where $\omega$ is the angular speed,
$\gamma$ is the density of the band,
g is the acceleration due to gravity,
$\sigma_0$ is the stress per unit area in the band,
A is the cross sectional area of the band,
$A_0$ is the cross sectional area of the band at the radius $R_0$, and where $0<K<1$, the cross sectional area of the band varying at each point therealong intermediate the applied load accepting regions such that, when the band is rotated, it is loaded only by a tensile stress.

5. A continuous band adaptable for use as an applied load accepting band in a centrifuge rotor, the rotor having at least a first and a second mounting strut thereon, the band having a central rotational axis extending therethrough and a first and a second applied load accepting region defined thereon, characterized in that the band, When removed from the struts, extends for a predetermined distance $L_{actual}$ measured along the band between the centers of the load accepting regions, the band, when mounted to the struts, extends for a predetermined distance $L_{assembled}$ measured along the band between the centers of the load accepting regions, the shape of the band when mounted on the struts between the load accepting regions thereon approximates the shape of an equilibrium curve defined between the applied load accepting regions, the equilibrium curve having a midpoint therealong, the distance in the plane perpendicular to the axis between the axis and the midpoint being defined by a predetermined reference line $R_0$, such that, in the plane perpendicular to the axis, at any angular position $\Theta$ from the reference line $R_0$, each point on the equilibrium curve between the midpoint thereof and a point adjacent to one of the applied load accepting regions lies a predetermined distance R from the axis, each distance R at the corresponding angular position $\Theta$ is defined by the relationship:

$$d(R/R_0)/d\Theta = (R/R_0)\,\text{RAD}[(R/R_0)^2](\exp\{-K\,[(R/R_0)^2-1]\}-1) \quad (1A)$$

$$K=[(\gamma\,\omega^2\,R_0^2)\,(1/g)\,(1/\sigma_0)] \quad (2A)$$

$$(A/A_0)=\exp\{-(K/2)\,[(R/R_0)^2-1]\} \quad (3A)$$

where $\omega$ is the angular speed,
$\gamma$ is the density of the band,
g is the acceleration due to gravity,
$\sigma_0$ is the stress per unit area in the band,
A is the cross sectional area of the band,
$A_0$ is the cross sectional area of the band at the radius $R_0$, and where $0<K<1$, the cross sectional area of the band varying at each point therealong intermediate the applied load accepting regions such that, when the band is rotated, it is loaded only by a tensile stress, the distance $L_{assembled}$ being substantially equal to a predetermined distance $L_{equilibrium}$ defined along the equilibrium curve between the radial centerlines of the load accepting regions of the band.

6. A centrifuge rotor comprising:

a hub having at least a first and a second strut; and a continuous band adaptable for use as an applied load accepting band in a centrifuge rotor, the band having a central rotational axis extending therethrough and at least a first and a second applied load accepting region defined thereon, characterized in that the band, when removed from the struts, extends for a predetermined distance $L_{actual}$ measured along the band between the centers of the load accepting regions, the band, when mounted to the struts at the load accepting regions, extends for a predetermined distance $L_{assembled}$ measured along a neutral axis of the band between the centers of the load accepting regions, the shape of the band when mounted on the struts approximates the shape of an equilibrium curve defined between the applied load accepting regions, the equilibrium curve having a midpoint therealong, the distance in the plane perpendicular to the axis between the axis and the midpoint being defined by a predetermined reference line $R_0$, such that, in the plane perpendicular to the axis, at any angular position $\Theta$ from the reference line $R_0$, each point on the equilibrium curve between the midpoint thereof and a point adjacent to one of the applied load accepting regions lies a predetermined distance R from the axis, each distance R at the corresponding angular position $\Theta$ is defined by the relationship:

$$d(R/R_0)/d\Theta = (R/R_0)\,\text{RAD}[(R/R_0)^2](\exp\{-K\,[(R/R_0)^2-1]\}-1) \quad (1A)$$

$$K=[(\gamma\,\omega^2\,R_0^2)\,(1/g)\,(1/\sigma_0)] \quad (2A)$$

$$(A/A_0)=\exp\{-(K/2)\,[(R/R_0)^2-1]\} \quad (3A)$$

where $\omega$ is the angular speed,
$\gamma$ is the density of the band,
g is the acceleration due to gravity,
$\sigma_0$ is the stress per unit area in the band,
A is the cross sectional area of the band,
$A_0$ is the cross sectional area of the band at the radius $R_0$, and where $0<K<1$, the cross sectional area of the band varying at each point therealong intermediate the applied load accepting regions such that, when the band is rotated, it is loaded only by a tensile stress, the distance $L_{assembled}$ being substantially equal to a predetermined distance $L_{equilibrium}$ defined along the equilibrium curve between the radial centerlines of the load accepting regions of the band.

* * * * *